(12) United States Patent
Lee et al.

(10) Patent No.: US 9,177,348 B2
(45) Date of Patent: Nov. 3, 2015

(54) NETWORK SYSTEM

(75) Inventors: Koonseok Lee, Seoul (KR); Hoonbong Lee, Seoul (KR); Yanghwan Kim, Seoul (KR); Munseok Seo, Seoul (KR); Junho Ahn, Seoul (KR); Daegeun Seo, Seoul (KR); Dalho Cheong, Seoul (KR); Bongmun Jang, Seoul (KR); Joongkeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 555 days.

(21) Appl. No.: 13/520,498

(22) PCT Filed: Jan. 5, 2011

(86) PCT No.: PCT/KR2011/000056
§ 371 (c)(1),
(2), (4) Date: Jul. 3, 2012

(87) PCT Pub. No.: WO2011/083967
PCT Pub. Date: Jul. 14, 2011

(65) Prior Publication Data
US 2013/0204448 A1  Aug. 8, 2013

(30) Foreign Application Priority Data

Jan. 5, 2010  (KR) .................. 10-2010-0000384
Dec. 15, 2010  (KR) .................. 10-2010-0128424

(51) Int. Cl.
*G06Q 50/06* (2012.01)
*G01D 4/00* (2006.01)
(Continued)

(52) U.S. Cl.
CPC ............... *G06Q 50/06* (2013.01); *G01D 4/004* (2013.01); *H04L 12/10* (2013.01); *H04L 12/12* (2013.01); *H04L 12/2803* (2013.01); *H04L 2012/285* (2013.01); *Y02B 60/34* (2013.01); *Y02B 90/242* (2013.01); *Y02B 90/244* (2013.01); *Y02B 90/245* (2013.01); *Y02B 90/246* (2013.01); *Y02B 90/248* (2013.01); *Y04S 20/322* (2013.01); *Y04S 20/327* (2013.01); *Y04S 20/40* (2013.01);
(Continued)

(58) Field of Classification Search
USPC ......... 700/286, 291, 295, 276, 278, 300, 275, 700/299; 705/34, 39, 410; 702/62; 340/539.3, 636.1, 870.07
See application file for complete search history.

(56) References Cited

U.S. PATENT DOCUMENTS 6,005,476 A  12/1999 Valiulis
6,453,687 B2 * 9/2002 Sharood et al. ................ 62/127
(Continued)

FOREIGN PATENT DOCUMENTS

CN  1656661 A  8/2005
KR  10-2005-0066453 A  6/2005
(Continued)

*Primary Examiner* — Kidest Bahta
(74) *Attorney, Agent, or Firm* — Dentons US LLP

(57) ABSTRACT

A component in a network system includes an energy consumption component capable of communicating with a home area network and capable of consuming an energy generated from an energy generation unit of a utility area network, and the energy consumption component including at least one control unit to drive the energy consumption component; and a communication module to allow communication between the energy consumption component and an external component constituting the utility area network or the home area network, wherein the communication module is disposed on a path through which a power is supplied to the at least one control unit.

18 Claims, 21 Drawing Sheets

(51) Int. Cl.
*H04L 12/10* (2006.01)
*H04L 12/12* (2006.01)
*H04L 12/28* (2006.01)

(52) U.S. Cl.
CPC .................. *Y04S 20/42* (2013.01); *Y04S 20/46* (2013.01); *Y04S 20/52* (2013.01)

(56) References Cited

U.S. PATENT DOCUMENTS

| | | | |
|---|---|---|---|
| 6,622,097 B2* | 9/2003 | Hunter | 702/61 |
| 6,651,178 B1* | 11/2003 | Voegeli et al. | 713/300 |
| 6,956,500 B1* | 10/2005 | Ducharme et al. | 340/870.02 |
| 7,353,121 B2* | 4/2008 | Baraty | 702/61 |
| 7,516,106 B2* | 4/2009 | Ehlers et al. | 705/412 |
| 8,178,802 B2* | 5/2012 | Roose et al. | 200/296 |
| 8,390,473 B2* | 3/2013 | Krzyzanowski et al. | 340/870.02 |
| 8,943,857 B2* | 2/2015 | Kappler et al. | 68/12.16 |
| 2002/0000092 A1* | 1/2002 | Sharood et al. | 62/127 |
| 2003/0178894 A1* | 9/2003 | Ghent | 307/140 |
| 2003/0233201 A1* | 12/2003 | Horst et al. | 702/62 |
| 2004/0117330 A1* | 6/2004 | Ehlers et al. | 705/412 |
| 2004/0133314 A1 | 7/2004 | Ehlers et al. | |
| 2009/0167547 A1 | 7/2009 | Gilbert | |
| 2010/0060479 A1* | 3/2010 | Salter | 340/870.4 |
| 2011/0061176 A1* | 3/2011 | Kappler et al. | 8/137 |

FOREIGN PATENT DOCUMENTS

| | | |
|---|---|---|
| KR | 10-2006-0022658 A | 3/2006 |
| KR | 10-2006-0037781 | 5/2006 |
| KR | 10-2007-0084811 A | 8/2007 |
| KR | 10-2009-0085920 A | 8/2009 |
| KR | 10-2009-0119754 A | 11/2009 |
| KR | 10-0963161 B1 | 6/2010 |

* cited by examiner (a)

(b)

(a)

(b)

NETWORK SYSTEM

This application claims the benefit of priority of PCT Application No. PCT/KR2011/000056 filed on Jan. 5, 2011 which claims the benefit of priority of Korean Application No. 10-2010-0000384 filed on Jan. 5, 2010 and Korean Application No. 10-2010-0128424 filed on Dec. 15, 2010, all of which are incorporated by reference in their entirety herein.

TECHNICAL FIELD

The present disclosure relates to a network system.

BACKGROUND

A provider simply provides an energy source such as electricity, water, and gas, and a consumer simply uses the provided energy source. Therefore, its effective management may be hardly achieved in terms of energy production, distribution, and usage.

That is, energy is distributed from an energy provider to a plurality of consumers, that is, a radial structure radiating from the center to the periphery, and is based on a one-way provider not consumers.

Since limited price information on electricity is provided through a power exchange not in real time and also its price system is actually a fixed price system, an inducement such as an incentive to consumers through a price change is unavailable.

In order to resolve the above issue, there have been sustained efforts to realize horizontal, collaborative, and distributed networks until now, which may effectively manage energy and allow interactions between consumers and providers.

SUMMARY

Embodiments provide a network system for effectively managing an energy source.

In one embodiment, a component for a network system includes an energy consumption component capable of communicating with a home area network and capable of consuming an energy generated from an energy generation unit of a utility area network, and the energy consumption component including at least one control unit to drive the energy consumption component; and a communication module to allow communication between the energy consumption component and an external component constituting the utility area network or the home area network, where the communication module is disposed on a path through which a power is supplied to the at least one control unit.

According to the present disclosure, since an energy source is effectively produced, used, distributed, and stored, its effective management may be achieved.

Additionally, since electronic products in each home may be driven and controlled by using energy information delivered from an energy provider, energy usage charges or power consumption may be reduced.

BRIEF DESCRIPTION OF THE DRAWINGS

FIG. 4(a) is a graph illustrating Time Of Use (TOU) information and Critical Peak Pattern information (CPP). FIG. 4(b) is a graph illustrating Real Time Pattern (RTP) information.

DETAILED DESCRIPTION OF THE EMBODIMENTS

Hereinafter, embodiments of the present invention will be described with reference to the accompanying drawings.

Figure 1:
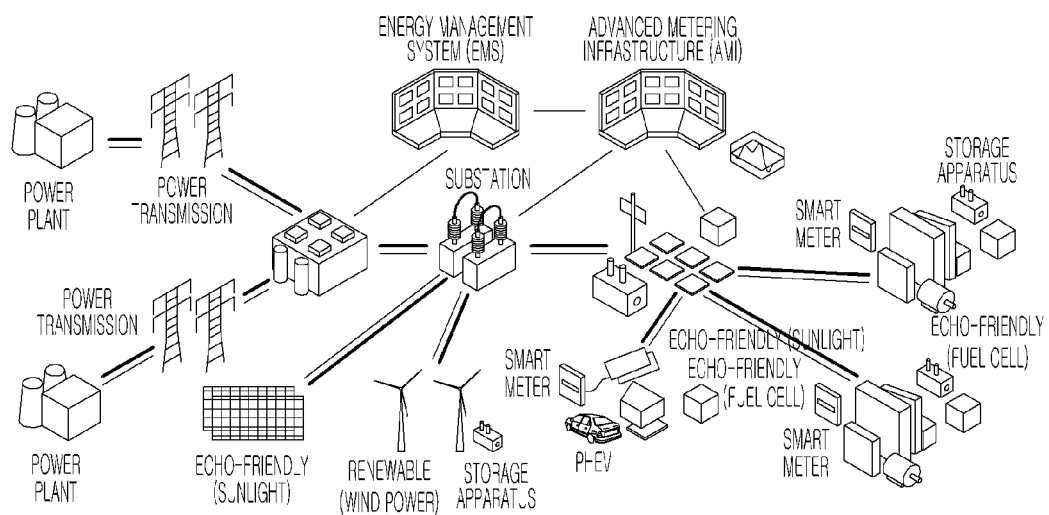
FIG. 1 is a schematic view of a network system according to an embodiment of the present invention.

FIG. 1 is a schematic view of a network system according to an embodiment of the present invention.

The network system is a system for managing an energy source such as electricity, water, and gas. The energy source may mean a source whose generation amount or usage amount can be metered.

Accordingly, an energy source, not mentioned in the above, may be a management target of the system. Hereinafter, electricity may be described as one example of an energy source, and the contents of this specification may be identically applied to another energy source.

Referring to FIG. 1, the network system according to an embodiment includes a power plant for generating electricity. The power plant may include a power plant for generating electricity through thermal power generation or nuclear power generation, and a power plant for generating electricity through eco-friendly energy such as water power, solar light, and wind power.

Moreover, the electricity generated in the power plant is transmitted to a power station, and then, is transmitted to a substation, so that it is distributed to consumers such as homes and offices.

Additionally, the electricity generated by eco-friendly energy is transmitted to a substation, so that it is distributed to each consumer. Moreover, the electricity transmitted from the substation is distributed to each office or home through an electricity storage device or directly.

A home using Home Area Network (HAN) may generate electricity by itself through solar light or a fuel cell mounted in a Plug in Hybrid Electric Vehicle (PHEV), store and distribute the generated electricity, or resell the remaining electricity to an outside (for example, an electric power company).

Furthermore, the network system may include a smart meter for measuring an electricity usage amount of a consumer (home or office) in real time and an Advanced Metering Infrastructure (AMI) for measuring electricity usage amounts of a plurality of consumers in real time. That is, the AMI may measure an electricity usage amount by receiving information measured by a plurality of smart meters.

In the specification, the above measurement includes measurement by a smart meter and AMI itself, and recognition by the smart meter and AMI after receiving generation amount or usage amount from another component.

Furthermore, the network system may further include an Energy Management System (EMS) for managing energy. The EMS may generate information on operations of at least one component in relation to energy (generation, distribution, use, and storage of energy). The EMS may at least generate a command related to an operation of a component.

In this specification, a function or solution performed by the EMS may be referred to as an energy management function or an energy management solution.

In the network system of the present embodiment, there may be at least one EMS as an additional configuration separated from another component, or the EMS may be included in at least one component as an energy management function or solution.

Figure 2:
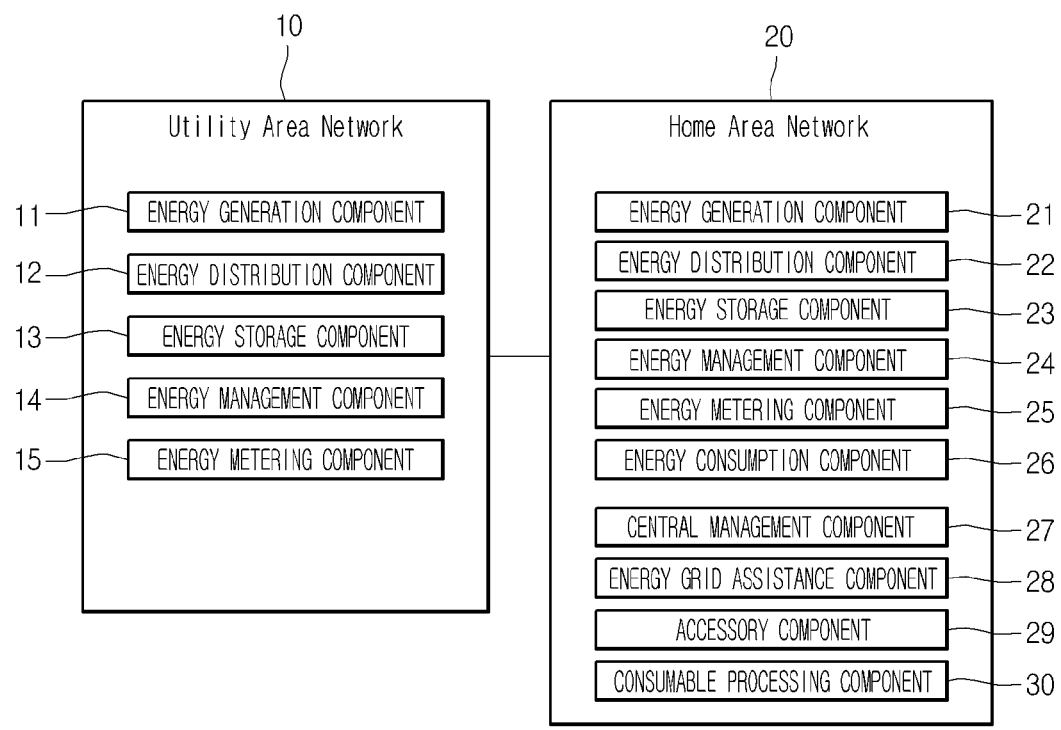
FIG. 2 is a schematic block diagram of a network system according to an embodiment of the present invention.

FIG. 2 is a schematic block diagram of a network system according to an embodiment of the present invention.

Referring to FIGS. 1 and 2, the network system of the present embodiment is configured using a plurality of components. For example, components of the network system include a power plant, a substation, a power station, an EMS, an appliance, a smart meter, a capacitor, a web server, an AMI, and a home server.

Additionally, according to the present embodiment, each component may be configured by a plurality of detailed components. As one example, if one component is an appliance, a micom, a heater, a display, and a motor, which constitute the appliance, may be detailed components.

That is, anything for performing a specific function may be a component in the present embodiment and these components constitutes the network system of the present embodiment. Moreover, two components may communicate with each other through a communication means.

Moreover, one network may be one component, or may be configured using a plurality of components.

In this specification, a network system, in which communication information relates to an energy source, may be called an energy grid.

A network system according to an embodiment may include a Utility Area Network (UAN) 10 and an HAN 20. The UAN 10 and the HAN 20 may perform a wire or wireless communication through a communication means.

In the specification, a home refers to the dictionary meaning, and also a group including specific components such as buildings and companies. Moreover, a utility means a group including specific components outside a home.

The UAN 10 may include at least one of an energy generation component 11 for generating energy, an energy distribution component 12 for distributing and/or delivering energy, an energy storage component 13 for storing energy, an energy management component 14 for managing energy, and an energy metering component 15 for metering energy related information.

When at least one component constituting the UAN 10 consumes energy, a component that consumes the energy may be an energy consumption component. That is, the energy consumption component may be separately configured or may be included in another component.

The energy generation component 11 may be a power plant, for example. The energy distribution component 12 distributes or delivers an energy generated from the energy generation component 11 or an energy stored in the energy storage component 13 to an energy consumption component. The energy distribution component 12 may be a power transmitter, a substation, or a power plant, for example.

The energy storage component 13 may be a capacitor, and the energy management component 14 may generate information for driving at least one of the energy generation component 11, the energy distribution component 12, the energy storage component 13, and the energy consumption component 26, in relation to energy. As one example, the energy management component 14 may at least generate a command related to an operation of a specific component.

The energy management component 14 may be an energy management device. The energy metering component 15 may measure information on generation, distribution, consumption, and storage of energy, and may be an AMI, for example. The energy management component 14 may be separately configured or may be included in another component.

The UAN 10 may communicate with the HAN 20 through a terminal component (not shown). The terminal component may be a gateway, for example. This terminal component may be included in at least one of the UAN 10 and HAN 20.

Moreover, the HAN 20 includes at least one of an energy generation component 21 for generating energy, an energy distribution component 22 for distributing energy, and energy storage component 23 for storing energy, an energy management component 24 for managing energy, an energy metering component 25 for metering energy related information, an energy consumption component 26 for consuming energy, a central management component 27 for controlling a plurality of components, an energy grid assistance component 28, an accessory component 29, and a consumable processing component 30.

The energy generation component 21 may be a generator for home use; the energy storage component 23 may be a capacitor; and an energy management component 24 may be an EMS.

The energy metering component 25 may measure information on generation, distribution, consumption, and storage of energy, and may be a smart meter, for example.

The energy consumption component 26 may include an appliance, which may be a refrigerator, a washing machine, an air conditioner, a cooking device, a cleaner, a drier, a dish washer, a dehumidifier, a display device, and a lighting device, or may include a heater, a motor, a display, and a control unit, which constitute an appliance. It is informed in this embodiment that there is no type limitation in the energy consumption component 26.

The energy management component 24 may be a separate component, or may be included in another component as an energy management function. The energy management component 21 may communicate with at least one component to transmit/receive information.

The energy generation component 21, the energy distribution component 22, and the energy storage component 23 may be separate components, or may constitute a single component.

The central management component 27 may be a home server for controlling a plurality of appliances, for example.

The energy grid assistance component 28 is a component for performing an additional function for the energy grid besides its original function. For example, the energy grid assistance component 28 may be a web service providing component (for example, a computer), a mobile device, or a television.

The accessory component 29 is an energy grid exclusive component for performing an additional function for an energy grid. For example, the accessory component 29 may be an energy grid exclusive weather receiving antenna.

The consumable processing component 30 is a component for storing, supplying, and delivering a consumable, and may confirm or recognize information on a consumable. The consumable may be an article or material, which is used or processed while the energy consumption component 26 operates. Also, the consumable processing component 30 may be handled by the energy management component 24 in an energy grid, for example.

For example, the consumable may be the laundry in a washing machine, the food in a cooking machine, a detergent or fabric softener for washing or softening the laundry in a washing machine, or a condiment for cooking a food.

The above mentioned energy generation components 11 and 21, energy distribution components 12 and 22, energy storage components 13 and 23, energy management components 14 and 24, energy metering components 15 and 25, energy consumption component 26, and central management component 27 may be separately provided, or at least two of them may constitute a single component.

For example, the energy management components 14 and 24, energy metering components 15 and 25, and central management component 27 may be provided as each single component, and thus, may serve as a smart meter, an EMS, and a home server, respectively. Or, the energy management components 14 and 24, energy metering components 15 and 25, and central management component 27 may mechanically constitute a single component.

Additionally, when one function is performed, it is sequentially performed in a plurality of components and/or communication means. For example, an energy management function may be performed sequentially in a separate energy management component, energy metering component, and energy consumption component.

Moreover, there may be a plurality of components having specific functions, which constitute the UAN and HAN. For example, there may be a plurality of energy generation components or energy consumption components.

Additionally, the UAN 10 or the HAN 20 may communicate with each other through a communication means (for example, a first interface). At this point, a plurality of UANs 10 may communicate with a single HAN 20, and a single UAN 10 may communicate with a plurality of HANs 20.

As one example, the communication means may be a simple communication line or a power line communication means. Of course, the power line communication means may include a communication device (for example, a modem), which is connected to two components simultaneously. As another example, the communication means may be zigbee, WiFi, and Bluetooth.

In this specification, there is no limitation in a wire communication method or a wireless communication method.

Two components constituting the UAN 10 may communicate with each other through a communication means.

Additionally, two components constituting the HAN 20 may communicate with each other through a communication means (for example, a second interface). As one example, the energy consumption component 26 may communicate with at least one of the energy management component 24, the energy metering component 25, the central management component 27, and the energy grid assistance component 28 through a communication means (for example, a second interface).

Moreover, a micom of each component (for example, the energy consumption component) may communicate with the communication means (for example, a second interface) through a communication means (for example, a third interface). For example, if the energy consumption component is an appliance, the appliance may receive information from the energy management component through a communication means (for example, a second interface), and may deliver the received information to its micom through a third interface.

Additionally, the energy consumption component 26 may communicate with the accessory component 29 through a communication means (for example, a fourth interface). Additionally, the energy consumption component 26 may communicate with the consumable processing component 30 through a communication means (for example, a fifth interface).

Figure 3:
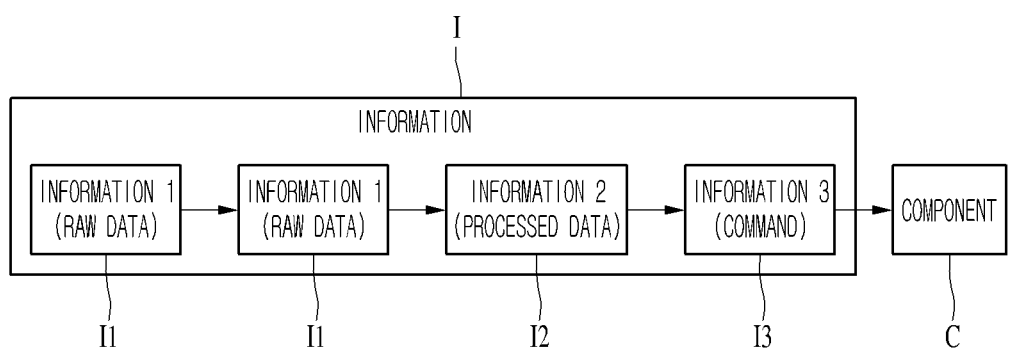
FIG. 3 is a block diagram illustrating an information delivery process on a network system according to an embodiment of the present invention.

FIG. 3 is a block diagram illustrating an information delivery process on a network system according to an embodiment of the present invention. FIGS. 4(a) and 4(b) are graphs illustrating electricity charge forms. FIG. 4(a) is a graph illustrating Time Of Use (TOU) information and Critical Peak Pattern information (CPP). FIG. 4(b) is a graph illustrating Real Time Pattern (RTP) information.

Referring to FIG. 3, in the network system of the present disclosure, a specific component C may receive energy related information (hereinafter, referred to as "energy information") through a communication means. Moreover, the specific component C may further receive additional information (such as environmental information, program update information, time information, operation or state information on each component such as malfunction, and habit information on a user using an energy consumption component) in additional to the energy information through a communication means.

The environmental information may include carbon dioxide emission amount, carbon dioxide concentration in the air, temperature, humidity, precipitation, rainfall occurrence, insulation, and air volume.

In another aspect, the information may include internal information, that is, each component related information (operation or state information (such as malfunction) of each component, energy usage information of an energy consumption component, and habit information of a user using an energy consumption component), and external information (energy information, environmental information, program update information, and time information).

At this point, the above information may be received from another component. That is, the received information includes at least energy information.

The specific component may be one component constituting the UAN 10 or the HAN 20.

The energy information I may be one of electricity, water and gas information as mentioned above.

As one example, examples of the electricity related information may include time-based pricing, curtailment, grid emergency, grid reliability, energy generation amount, operation priority, and energy consumption amount. In this embodiment, a charge related to an energy source may be regarded as an energy charge.

That is, energy information includes charge information (for example, energy charge) and other than charge information (for example, curtailment, grid emergency, grid reliability, energy generation amount, operation priority, and energy consumption amount).

This information may include scheduled information generated in advance based on previous information and real time information varying in real time. The scheduled information and the real time information may be divided based on information prediction after the current time (i.e., the future).

Moreover, the energy information I may be classified as TOU information, CPP information, or RTP information on the basis of a change pattern of data over time. Furthermore, the energy information I may vary over time.

Figure 4:
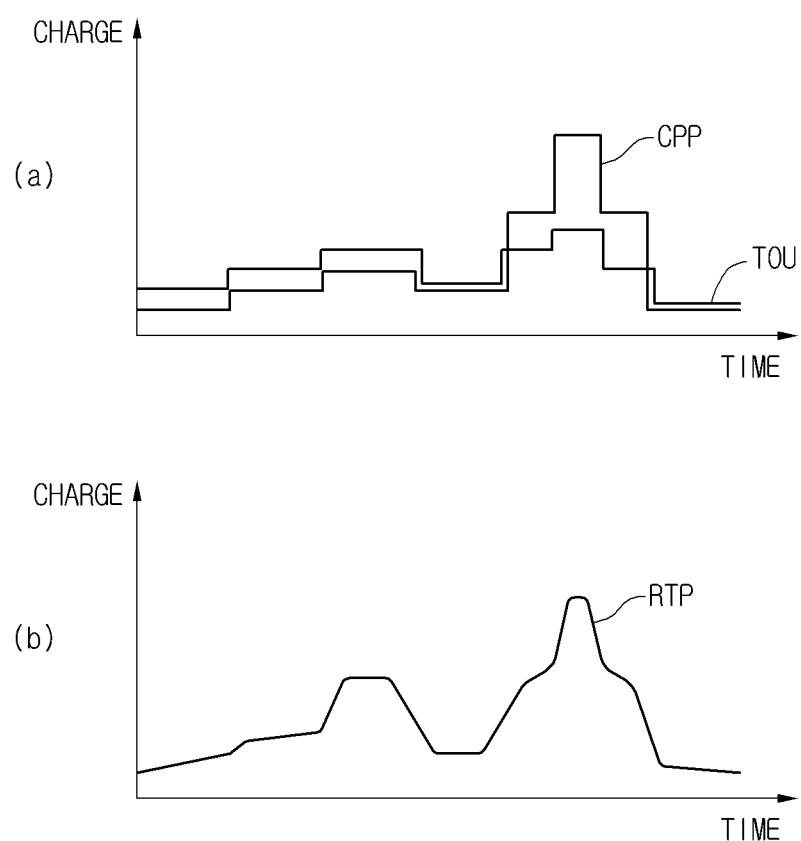
FIGS. 4(a) and 4(b) are graphs illustrating electricity charge forms.

Referring to FIG. 4(*a*), data are gradually changed over time according to the TOU information. According to the CPP information, data are gradually changed over time or in real time, and emphasis is indicated at the specific timing. That is, in the case of a CPP pattern, a general charge is cheaper than that of a TOU pattern but a charge at the specific timing is significantly more expensive than that of the TOU pattern.

Referring to FIG. 4(*b*), according to the RTP information, data are changed in real time over time.

Furthermore, the energy information I may be transmitted or received as a true or false signal such as Boolean, as actual price information, or as a plurality of levels. Hereinafter, electricity related information will be described with an example.

If the specific component C receives a true or false signal such as Boolean, one signal is recognized as an on-peak signal and the other signal is recognized as an off-peak signal.

Unlike this, the specific component may recognize at least one driving related information including an electricity charge, and may recognize on-peak and off-peak by comparing the recognized information value with a reference information value.

For example, if the specific component recognizes leveled information or actual price information, it recognizes on-peak and off-peak by comparing the recognized information value with a reference information value.

At this point, the driving related information value may be one of an electricity charge, a power amount, a change rate of electricity charge, a change rate of power amount, an average value of electricity charge, and an average value of power amount. The reference information value may be at least one of an average value, an average value of the minimum value and the maximum value of power information during a predetermined interval, and a reference change rate (for example, a slope of power consumption amount per unit time) of power information during a predetermined interval.

The reference information value may be set in real time or in advance. The reference information value may be set in a UAN or a HAN (which may be inputted through a consumer direct input, an energy management component, or a central management component).

If the specific component (for example, an energy consumption component) recognizes on-peak (for example, a recognition time), it may output 0 (i.e., stop or maintain a stop status) or may reduce an output. The specific component may determine a driving type in advance before starting, and may change the driving type when recognizing on-peak after starting.

Moreover, when the specific component recognizes off-peak, it may restore or increase an output if necessary. That is, the specific component, which is recognizing on-peak currently, recognizes off-peak, it may restore the output to a previous status or increase the output more than before.

At this point, when the specific component restores or increases the output after recognizing off-peak, it is obvious that entire power consumption and/or total electricity usage charge are/is reduced during an entire driving time of the specific component.

Or, if the specific component recognizes on-peak (for example, a recognition time), it may maintain an output if an operational condition is satisfied. At this point, the operational condition means the case that an information value for driving is less than or equal to a predetermined reference. The information value for driving may be information on an electricity charge, a power consumption amount, or an operation time. The predetermined reference may be a relative value or an absolute value.

The predetermined reference may be set in real time or in advance. The predetermined reference may be set in a UAN or a HAN (which may be inputted through consumer direct input, an energy management component, or a central management component).

Or, if the specific component recognizes on-peak (for example, a recognition time), it may increase an output. However, even if the output is increased at the timing of recognizing on-peak, the total output amount of the specific component during an entire driving period may be reduced less than or maintained equal to that of when the specific component operates with a normal output.

Or, even if the output is increased at the timing of recognizing on-peak, the total output amount or total electricity charge of the specific component during an entire driving period may be reduced less than that of when the specific component operates at a normal output.

When the specific component recognizes off-peak (for example, a recognition time), it may increase the output. For example, if an operation reservation is set, the specific component starts driving, or a component having the largest output among a plurality of components may start driving first, before the set time.

Additionally, it is possible to overcool a refrigerator by increasing an output than a typical output, or store hot water in a water tank for a washing machine or a dish washer by driving a heater before a scheduled time for an operation of the heater. This is to reduce an electricity charge by driving a component in off-peak in advance, which is supposed to operate in the upcoming on-peak.

When the specific component recognizes off-peak (for example, a recognition time), it may retain electricity.

In the present disclosure, the specific component (for example, an energy consumption component) may maintain, reduce, or increase an output. Accordingly, the specific component may include a power changing component. Since the power may be defined by current and voltage, the power changing component may include a current adjustor and/or a voltage adjustor. The power changing component may operate in response to a command generated from an energy management component, for example.

Moreover, the curtailment information is information related to a mode, in which a component stops or consumes less power for a less electricity charge. The curtailment information may be transmitted or received as a true or false signal such as Boolean on a network system, for example. That is, a stop signal (e.g., a turn off signal) or a reduce signal (e.g., a lower power signal) may be transmitted/received.

If the specific component recognize curtailment information, as mentioned above, it may output 0 (i.e., stop or maintain a stop status: when recognizing a turn off signal) or reduce an output (when recognizing a lower power signal).

The grid emergency information may relates to power failure, and may be transmitted/received as a true or false signal such as Boolean, for example. The information on power failure relates to the reliability of a component using energy.

When the specific component recognizes emergency information, it may be immediately shut down.

When the specific component receives the emergency information as scheduled information, it increases the output prior to the upcoming emergency timing, so that it may operate like in the above mentioned off-peak of the specific component. Then, the specific component may be shut down at the emergency timing.

The grid reliability information as information on large or small electricity supply amount or information on electricity quality may be transmitted/received as a true or false signal such as Boolean, or may be determined by a component (for example, an appliance) through a frequency of AC power supplied thereto.

That is, if a lower frequency than a reference frequency of AC power supplied to a component is recognized, it is determined that the electricity supply amount is insufficient (i.e., information on the insufficient electricity supply). Also, if a higher frequency than the reference frequency of AC power is recognized, it is determined that the electricity supply amount is excessive (i.e., information on the excessive electricity supply).

When the specific component recognizes information on insufficient electricity amount or poor electricity quality in the grid reliability information, as mentioned above, it may output 0 (stop or maintain a stop status), reduce, maintain, or increase the output if necessary.

On the contrary, when the specific component recognizes information on excessive electricity supply amount, it may increase the output or switch from an off status to an on status.

Information on energy increase as information on a status that surplus electricity occurs as an electricity usage amount of a component that consumes energy is less than a generation amount may be transmitted or received as a true or false signal such as Boolean.

When the specific component recognizes the information on energy increase, it may increase the output. For example, if an operation reservation is set, the specific component starts driving, or a component having the largest output among a plurality of components may start driving first, before the set time. Additionally, it is possible to overcool a refrigerator by increasing an output than a typical output, or store hot water in a water tank for a washing machine or a dish washer by driving a heater before a scheduled time for an operation of the heater. When the specific component recognizes off-peak (for example, a recognition time), it may retain electricity.

Among the above-mentioned energy related information, the on-peak information, the curtailment information, and the information on insufficient electricity supply amount may be recognized as high-price information, i.e., understood as a relatively high energy price.

On the contrary, among the above-mentioned energy related information, the off-peak information, the information on energy increase, and the information on excessive electricity supply amount may be recognized as low-price information, i.e., understood as a relatively low energy price.

The information related to the high/low energy charge (i.e., high or low cost information) may be recognized as information used for determining a power saving driving mode of a specific component (for example, an energy consumption component). That is, by using the information related to the high/low energy charge, a time slot (or area) according to an energy charge or a charge slot (or area) for determining a driving mode of a component may be divided into at least two, and then, recognized.

As one example, when energy related information is recognized as a Boolean signal, the time slot according to an energy charge or a charge slot for determining a driving mode of a component may be recognized as two. When the energy related information is divided into a plurality of levels or is recognized in real time, the time slot or the charge slot may be recognized as at least three.

Moreover, at least information related to an energy charge corresponding to a time may be classified and recognized as information for determining a saving power driving mode. That is, by using the information related to an energy charge, a time slot (or area) or a charge slot (or area) may be classified as at least two, and then, recognized. As mentioned above, the classified time slot or charge slot may be determined according to types of recognized information (for example, Boolean, a plurality of levels, and real time information).

In other words, by using the information on high/low energy charge, at least two determination factors for driving a component may be classified and recognized. The determination factor may include a function for time and energy charge.

When the information on energy charge is recognized in at least two levels, a specific component may have a driving mode determined according to the level information.

On the contrary, if the recognized information on energy charge is not classified according to a specific standard (for example, real time charge information), it is compared with predetermined information, and according to a comparison result, the driving mode of a specific component may be determined.

Here, the predetermined information may be reference information (for example, a reference value) for classifying information on energy charge, and the comparison result may refer to whether the information on energy charge is lower or higher than the reference value.

Moreover, in more detail, various types of information related to the energy may include unprocessed first information I1, second information I2 obtained by processing the first information, and third information I3 for performing a function of the specific component. That is, the first information is raw data, the second information is refined data, and the third information is a command for performing a function of the specific component.

Moreover, energy related information is included in a signal and then is delivered. At this point, at least one of the first to third information may be delivered several times with only a signal changed and no content changed.

As one example, as shown in the drawing, one component receiving a signal including the first information I1 may convert only the signal, and then, may transmit the converted new signal including the first information I1 to another component.

Accordingly, signal conversion and information conversion are described as different concepts in this embodiment. At this point, it is easily understood that a signal is converted together when the first information is converted into the second information.

However, the third information may be delivered several times with a content converted, or may be delivered several times with the same content maintained but only a signal converted.

In more detail, if the first information is unprocessed electricity charge information, the second information may be processed electricity charge information. The processed electricity charge information may be information on the electricity charge in a plurality of levels or analysis information. The third information is a command generated based on the first information or the second information.

A specific component may generate, transmit, or receive at least one of the first to third information. The first to third information is not necessarily transmitted/received sequentially.

For example, only the third information may be transmitted or received several times sequentially or in parallel without the first and second information. Or, the first and third information is transmitted or received together; the second and third information is transmitted or received together; or the first and second information is transmitted or received together.

As one example, when a specific component receives the first information, it may transmit the second information, the second and third information, or only the third information.

When a specific component receives only the third information, it may generate and transmit new third information.

Moreover, in relationship between two information, one information is a message and the other is a response to the message. Accordingly, each component constituting the network system may transmit or receive a message and may respond to a message if the message is received. Accordingly, transmitting a message and responding to the message are relative concept in the case of a separate component.

The message may include data (first information or second information) and/or a command (third information).

The command (the third information) may include a data storing command, a data generating command, a data processing command (including generating additional data), a command for generating an additional command, and a command for delivering an additionally generated command.

In the specification, responding to a received message means storing data, processing data (including generating additional data), generating a new command, transmitting a new generated command, simply delivering a received command (may generate a command for delivering the received command to another component), operating, transmitting stored information, and transmitting a confirmed message (an acknowledge character or a negative acknowledge character).

For example, if a message is first information, a component receiving the first information may generate second information by processing the first information, generate second information and new third information, or generate only third information, in response to the message.

In more detail, when the energy management component receives first information (internal information and/or external information), it may generate second information and/or third information to transmit it to at least one component (for example, an energy consumption component) constituting the HAN. Moreover, the energy consumption component 26 may operate according to the third information received from the energy management component 24.

A component receiving a message may make an energy related response. Here, "response" may be understood as a concept including an operation that performs a function thereof. As one example, the HAN 20 receives a message and performs an energy related operation.

An energy related response (operation) of a component will be described in more detail. The component may be an energy consumption component.

The energy consumption component may be driven with an energy charge of when it is driven based on the recognition on energy information, which is less than an energy charge of when it is driven without the recognition on energy information.

The component may have a plurality of modes driven for self function execution. The plurality of modes may include a first mode and a second mode for relatively saving an energy charge than the first mode, at last one of which may be used for driving.

Here, the first mode is a normal mode and the second mode is a saving mode. Both the first and second modes may be a saving mode.

The normal mode may be understood as a mode for performing a self function of a component without recognizing energy information. On the contrary, the saving mode may be understood as a mode for performing a self function of a component on the basis of the recognition on energy information.

If the first and second modes are a saving mode, the first mode may refer to a driving mode for saving an energy charge, and the second mode may refer to a driving mode that saves an energy charge more than the first mode.

Moreover, in relation to the driving of a specific component (for example, an energy consumption component), at least a portion of a driving mode including at least a driving time and course is recognized; an unrecognized portion for saving an energy charge may be generated; and a recognized portion may be changed into another mode.

For example, at least a portion of the driving mode may be recognized through user setting, a control of an energy management component, or a self control of an energy consumption component. Moreover, if a specific driving mode is further required in order to save an energy charge, an unrecognized portion of the driving mode may be newly generated, and simultaneously, a recognized portion may be changed into another mode for energy saving.

Of course, a process for generating an unrecognized portion may be omitted, and in this case, a process for changing the recognized portion into another mode may be performed. In other hands, a process for changing the recognized portion into another mode may be omitted and a process for newly generating the unrecognized portion may be performed.

The driving time may include a driving start time or a driving end time of a component. Moreover, the course may include a driving period and output of a component.

The generated mode or changed mode may be recommended by a specific component in order to save an energy charge. Here, the specific component may be an energy consumption component (control component) or an energy management component.

As one example, if the recognized driving mode is a specific driving time, the specific driving time may change into another time and a specific course may be generated in order to save an energy charge.

On the other hand, if the recognized driving mode is a specific course, the specific course may change into another course and a specific time may be generated in order to save an energy charge.

According to such a control, a time or output value change may be made for an output function of a component over time.

The generated mode or changed mode is made within a predetermined range. That is, when at least a portion of the driving mode is recognized, the driving mode may be generated or changed based on a predetermined standard (for example, restrictions set by a user or set through a control of an energy management component or an energy consumption component).

Accordingly, generating the unrecognized portion or changing a recognized portion into another mode is performed without departing from the predetermined standard.

Figure 5:
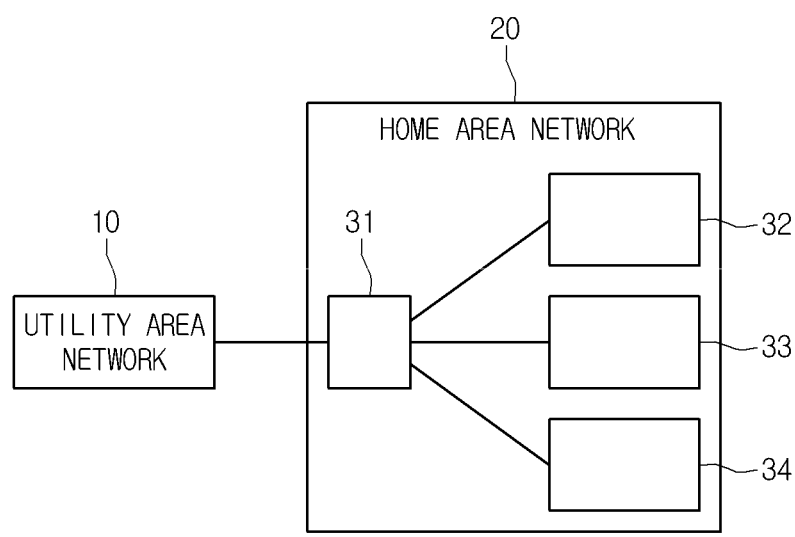
FIG. 5 is a schematic block diagram illustrating a network system according to a first embodiment.

FIG. 5 is a schematic block diagram illustrating a network system according to a first embodiment.

Referring to FIG. 5, a first component 31 of the HAN may directly communicate with the UAN 10. The first component 31 may communicate with a plurality of components 32, 33, and 34 (i.e., second to fourth components) of the HAN 10. At this point, it is apparent that there is no limitation in the number of components in the HAN, which communicate with the first component 31.

That is, the first component 31 serves as a gateway in this embodiment. The first component 31 may be one of an energy management component, an energy metering component, a central management component, and an energy consumption component, for example.

In this present disclosure, a component serving as a gateway may allow components to communicate with each other through different communication protocols, or the same communication protocol.

Each of the second to fourth components 32, 33, and 34 may be one of an energy generation component, an energy distribution component, an energy management component, an energy storage component, an energy metering component, a central management component, an energy grid assistance component, and an energy consumption component, for example.

The first component 31 may receive information from at least one component constituting the UAN 10 or the HAN 20, and then, may process the received information and transmit it to the second to fourth components 32, 33, and 34. For example, if the first component 31 is an energy metering component, it may receive electricity charge information, and then, may transmit it to an energy management component and an energy consumption component.

Moreover, each of the first to fourth components may communicate with another component. For example, the first component 31 may be an energy metering component, and the second component 32 may be an energy management component. Also, the energy management component may communicate with at least one energy consumption component.

Figure 6:
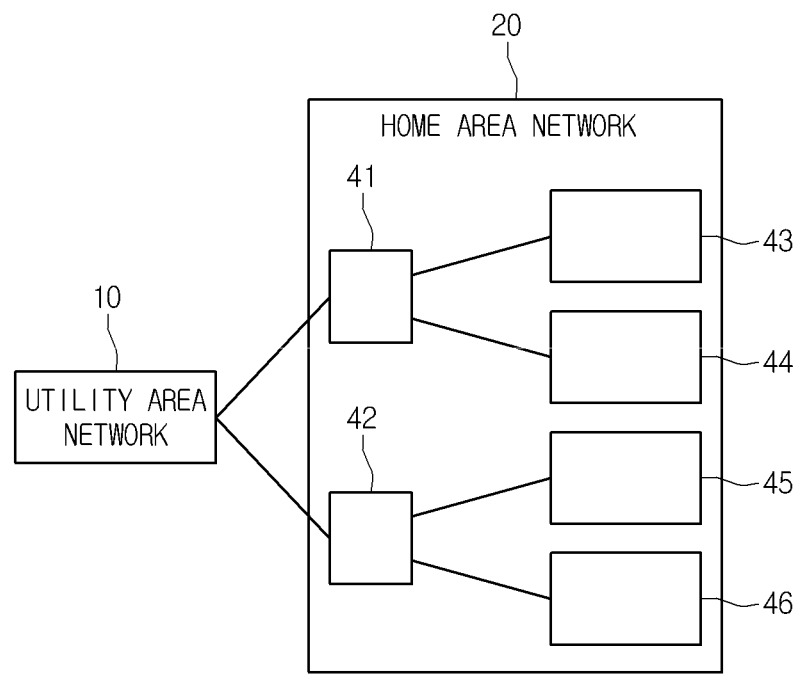
FIG. 6 is a schematic block diagram illustrating a network system according to a second embodiment.

FIG. 6 is a schematic block diagram illustrating a network system according to a second embodiment.

Referring to FIG. 6, a plurality of components constituting the HAN 20 of the present embodiment may directly communicate with the UAN 10.

That is, the present embodiment includes a plurality of components 41 and 42 (i.e., first and second components) serving as a gateway. The first and second components may have the same type or different types.

Moreover, the first component 41 may communicate with at least one component (for example, the third and fourth components 43 and 44), and the second component 42 may communicate with at least one component (for example, fifth and sixth components 45 and 46).

For example, each of the first and second components may be one of an energy management component, an energy metering component, a central management component, an energy grid assistance component, and an energy consumption component, for example.

Each of the third to sixth components may be one of an energy generation component, an energy distribution component, an energy management component, an energy metering component, a central management component, an energy grid assistance component, and an energy consumption component, for example.

Figure 7:
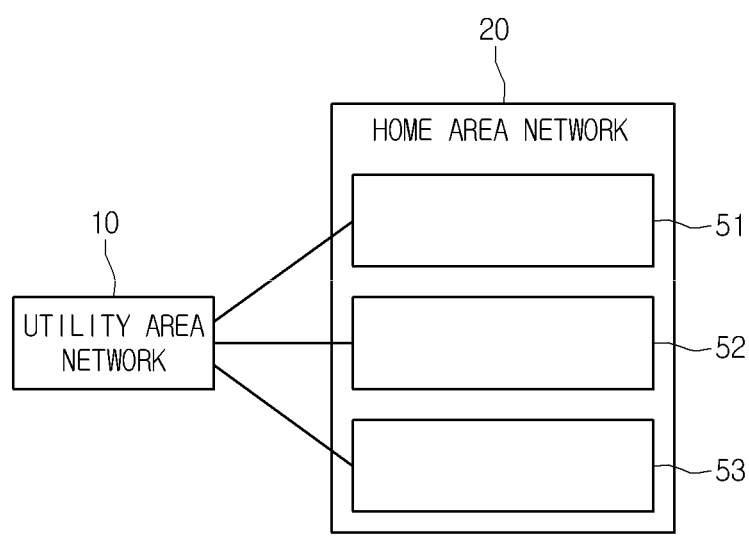
FIG. 7 is a schematic block diagram illustrating a network system according to a third embodiment.

FIG. 7 is a schematic block diagram illustrating a network system according to a third embodiment.

Referring to FIG. 7, each of the components 51, 52, and 53 constituting an HAN of this embodiment may directly communicate with the UAN 20. That is, like the first and second embodiments, each of the components 51, 52, and 53 may communicate with a UAN without a component serving as a gateway.

Figure 8:
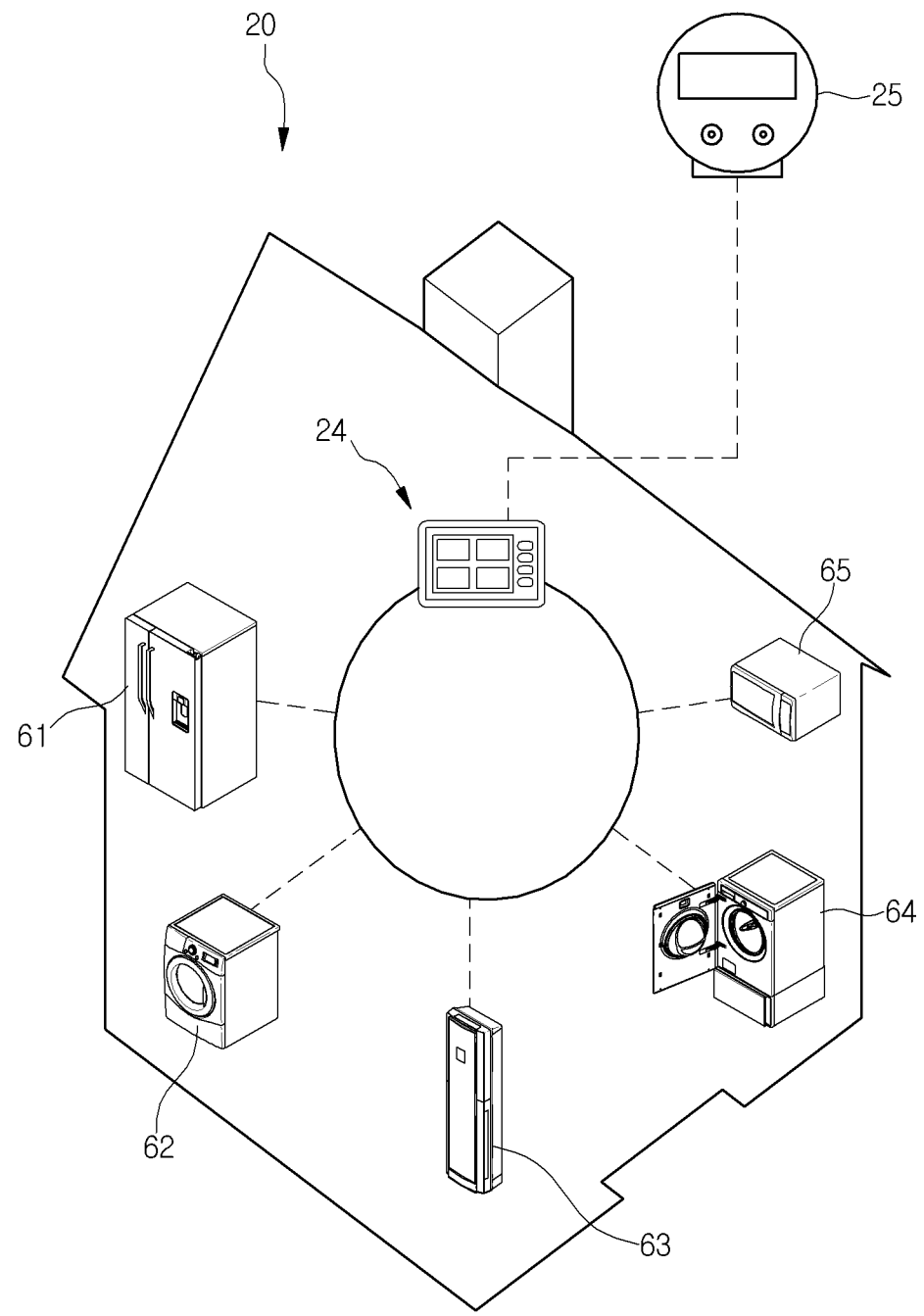
FIG. 8 is a schematic view illustrating an HAN according to an embodiment of the present invention.

FIG. 8 is a schematic view illustrating an HAN according to an embodiment of the present invention.

Referring to FIG. 8, the HAN 20 may include an energy metering component 25 for metering a power supplied from the UAN 10 to each home and/or an electricity charge in real time, and an energy management component 24 connected to the energy metering component 25, and appliances to control their operations.

Moreover, electricity of each home may be charged at hourly rates. That is, an electricity charge per hour becomes expensive at a time slot of when power consumption is drastically increased, and becomes cheaper at a time slot of when power consumption is relatively less.

The energy management component 24 may be connected to appliances 26 such as a refrigerator 61, a washing machine 62, an air conditioner 63, a drier 64, or a cooking appliance 65 via a network inside a home for two-way communication.

Communication in a home may be performed in a wireless way such as Zigbee and WiFi or a wired way such as power line communication (PLC). One appliance may be connected to other appliances for communication.

Figure 9:
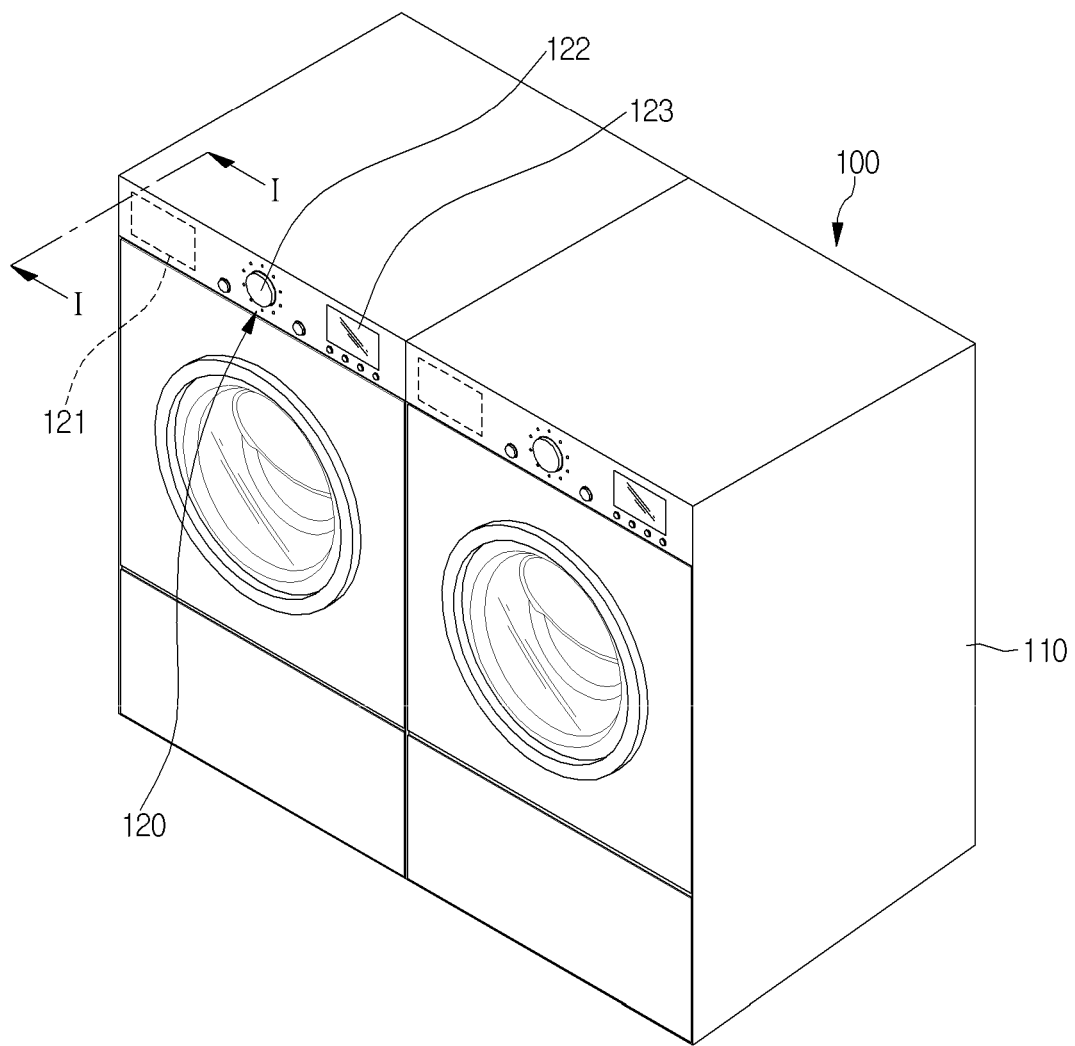
FIG. 9 is a perspective view illustrating a configuration of an appliance according to an embodiment.
Figure 10:
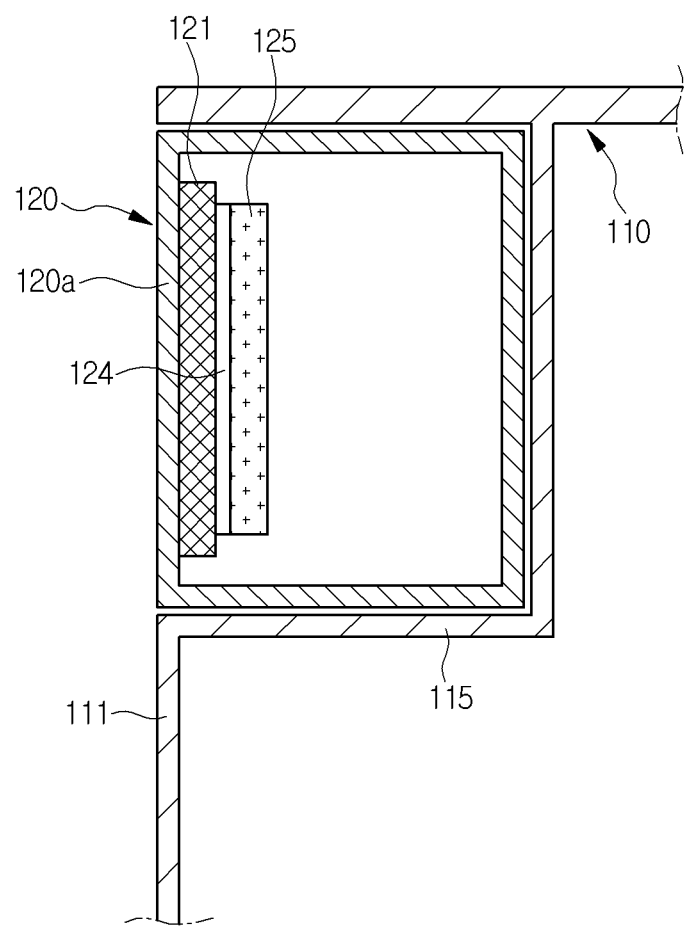
FIG. 10 is a sectional view taken along the line I-I' of FIG. 9.

FIG. 9 is a perspective view illustrating a configuration of an appliance according to an embodiment. FIG. 10 is a sectional view taken along the line I-I' of FIG. 9.

Referring to FIGS. 9 and 10, the appliance 100 as an energy consumption component includes a case 110 for forming an outer appearance and protecting the inner space, and a control panel 120 at the front part of the case 110 for displaying an operational status of the appliance 100 or inputting an operation command.

The case 110 may have a roughly rectangular shape whose front part is partially open. The appliance 100 is configured with a set including a washing machine and a drier as shown in FIG. 9, but the present invention is not limited thereto. That is, the set may include an air conditioner, a refrigerator, and a cooking appliance.

The case 110 includes a panel receiving part 115 where the control panel 120 is received. The panel receiving part 115 is formed bending from the front part 111 of the case 110 toward the rear.

The control panel 120 includes a display unit 123 for displaying an operational status of the appliance 100 and an input unit 122 for inputting a predetermined command to operate the appliance 100.

The control panel 120 further includes a panel control unit 121 for controlling an operation of the control panel 120. The panel control unit 121 may be disposed at the back of the front part 120a of the control panel 120. The panel control unit 121 may be a Printed Circuit Board (PCB).

A communication module 125 for allowing the appliance 100 to communicate with an external device is disposed at one side of the panel control unit 121. That is, the communication module 125 may be built in the control panel 120.

In more detail, the communication module 125 may coupled to the panel control unit 121 through a coupling port 124. The coupling port 124 may be equipped in the panel control unit 121 or the communication module 125.

If the coupling port 124 is equipped in the panel control unit 121, the communication module 125 may be inserted into the panel control unit 121, and if the coupling port 124 is equipped in the communication module 125, the panel control unit 121 may be inserted into the communication module 125.

Moreover, the communication module 125 may be connected to the panel control unit 121 by a wire, and may be disposed at one side of the control panel 120.

As the communication module 125 is coupled to the panel control unit 121, applied power may be supplied to the panel control unit 121. Accordingly, since power is easily supplied to the communication module 125, reliability related to an operation of the communication module 125 may be obtained.

That is, the communication module 125 may be disposed at a path through which external power is supplied to the panel control unit 121 in order to drive the appliance 100.

Another embodiment is suggested.

The communication module 125 may coupled to a main control unit of the appliance 100 not a control unit of the control panel 120. The main control unit may be understood as a control unit for controlling an operation of one component equipped for performing an original function. As one example, if the appliance 100 is a washing machine, the main control unit may be understood as a control unit for controlling a driving unit that generates rotation power.

As the communication module 125 is connected to the main control unit, power may be easily supplied to the communication module 125.

Moreover, since the communication module 125 is equipped at the control panel of the appliance 100, i.e., the front part, a signal may be easily provided from the external device.

That is, since the front part of the appliance 100 is generally disposed facing toward the inner (i.e., the central part) of an installation space and the communication module 125 is disposed at the front part of the appliance 100, signal transmission may be smoothly performed.

Especially, if an external (for example, the case 110) of the appliance 100 is made of conductive material, signal transmission may be limited. It is reasonable that a communication module is disposed at the front part of an appliance 100 for smooth signal transmission.

The external device may be a component that communicates with the appliance 100. The component may include at least one of a plurality of components constituting a network (for example, a UAN or a HAN).

As one example, the component may be the energy generation components 11 and 21, the energy distribution components 12 and 22, the energy storage components 13 and 23, the energy management components 14 and 24, the energy metering components 15 and 25, or another energy consumption component 26. For convenience of description, those components are called "external components" that communicate with the appliance 100.

Figure 11:
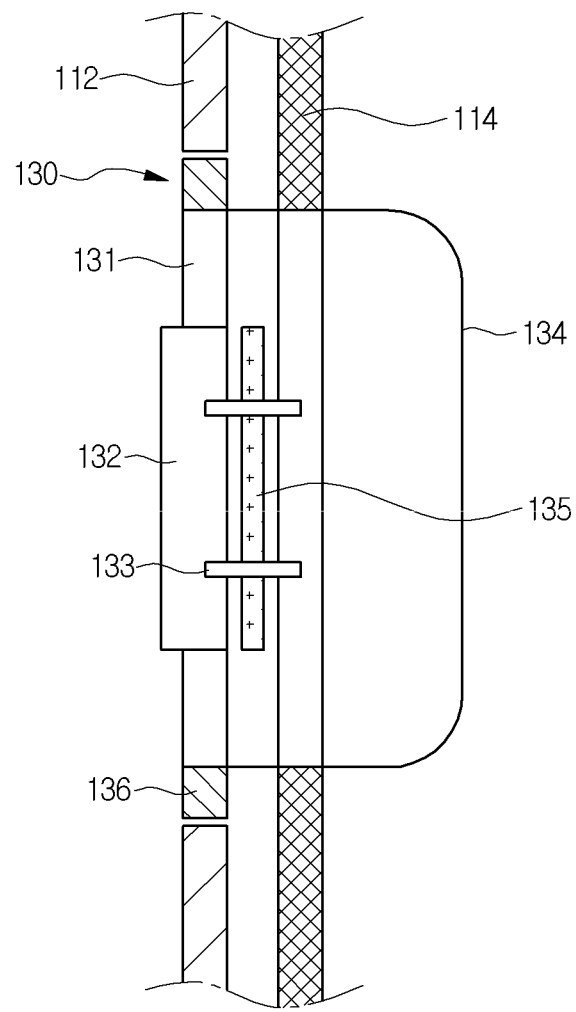
FIG. 11 is a sectional view illustrating a coupling position of a communication module according to an embodiment.

FIG. 11 is a sectional view illustrating a coupling position of a communication module according to an embodiment.

Referring to FIG. 11, the appliance 100 includes a door 130 coupled to one side of the case 110 in order to selectively screen the inner space of the case 110.

The door 130 includes a see through part 131 for seeing through the inside of the case 110, a frame 136 for forming the outline part of the see through part 131, a hinge part 132 for forming a rotation center of the door 130, and an inside protruding part 134 extending from the see through part 131 toward the inside of the case 110.

The hinge part 132 includes a hinge protrusion coupled to at least a portion of the case 110.

The case 110 includes a first case 112 disposed to contact the frame 136 and a second case 114 provided in the first case 112. The first case 112 is spaced a predetermined distance from the second case 113.

The first case 112 and the second case 114 may include an opening part corresponding to the door 130, which is coupled to the door 130. The inside protrusion part 134 extends into the inside of the case 110 through the opening part to close the opening part.

The hinge protrusion 133 extends from one side of the hinge part 132 toward the inside of the case 110 and is coupled to the second case 114.

Moreover, the communication module 135 for performing a communication of the appliance 100 is disposed in the spaced spatial between the first case 112 and the second case 114. The communication module 135 may be fixed by the hinge protrusion 133.

In more detail, the communication module 135 may be coupled to one side of the hinge protrusion 133 or may penetrate the hinge protrusion 133 for coupling. Here, when the hinge protrusion 133 is "coupled" to the communication module 135 through the penetration, it is actually understood as "penetrating" the case 220 of FIG. 12 of the communication module 135 for coupling.

As mentioned above, as the communication module 135 is disposed at the hinge part 132, an additional space for placing a communication module at the appliance 100 may not be required.

Moreover, in view of the fact that the door 130 is generally equipped at the front part of an appliance, signal transmission may be smoothly obtained.

Hereinafter, a method of coupling a module assembly to an appliance will be described. A portion not described will refer to the reference number and description of the above embodiment.

Figure 12:
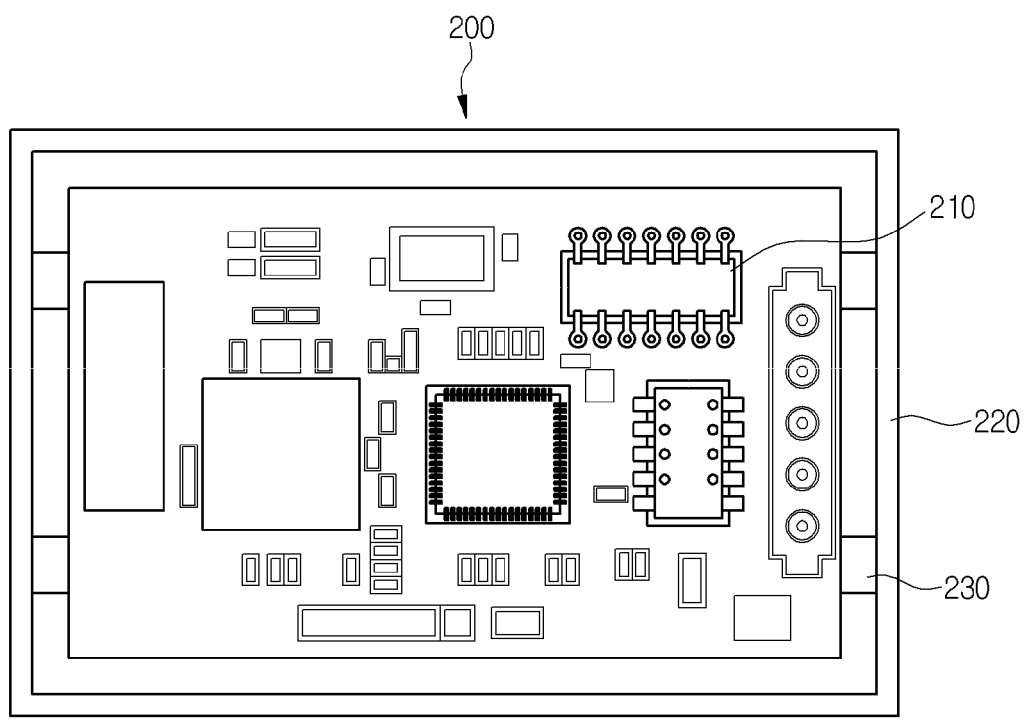
FIG. 12 is a view illustrating a module assembly according to a first embodiment.
Figure 13:
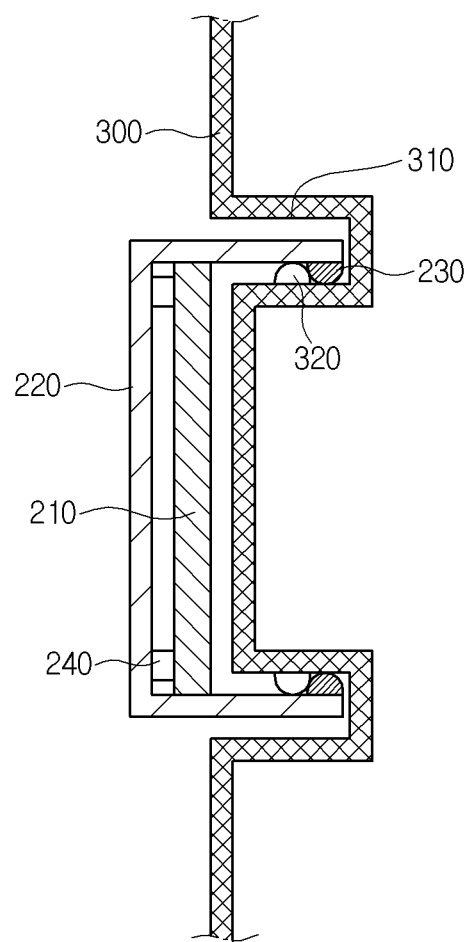
FIG. 13 is a sectional view when the module assembly is coupled to a module coupling part.

FIG. 12 is a view illustrating a module assembly according to a first embodiment. FIG. 13 is a sectional view when the module assembly is coupled to a module coupling part.

Referring to FIGS. 12 and 13, the module assembly 200 according to an embodiment includes a communication module 210 provided as a communication means of the appliance 100, a module case 220 for receiving the communication module 210 therein, and a first protrusion 230 disposed inside the module case 220 and provided as a coupling means of the module assembly 200.

The communication module 210 may be a modem for wire/wireless communication. As one example, the communication module 210 may include a Zigbee module, a Bluetooth module, a WiFi access point (AP), or a power line communication module.

The module case 220 screens the outside of the communication module 210 and is configured to protect the communication module 210. The front part of the module case 220 is open and the communication module 210 therein is confirmed through the opened front part.

The module case 220 may be formed of non-conductive material or its inside or outside may be coated with non-conductive material. In this case, signal transmission may be smoothly obtained. When the module case 220 is formed of metallic material, signal delivery interference may be prevented.

There may be a plurality of the first protrusions 230, which protrude from the inner surface of the module case 220 toward the inside thereof.

The communication module 210 may be deeply fixed at the inner side of the module case 220. That is, the communication module 210 is disposed at the rear (i.e., the ground direction) of the first protrusion 230 in the direction shown in FIG. 12.

The communication module 210 is fixed at the inner side of the module case 220, and its fixing method includes coupling by a coupling member 240 of FIG. 13 or an adhesive member.

The module assembly 200 is coupled to a module coupling part 300 equipped in the appliance 100. Here, the module coupling part 300 is a portion to which the module assembly 200 is coupled, for example, the inside of the control panel 120, one side of the main control unit, and a door hinge part.

The module coupling part 300 includes a case insertion groove 310 to which the module case 220 is inserted and a second protrusion 320 to which the first protrusion is coupled.

The case insertion groove 310 is concavely dented in order for at least a portion of the module case 220 to be inserted therein. Additionally, the second protrusion 320 is formed protruding at the inner side of the case insertion groove 310.

The module case 220 is pressed and coupled to the module coupling part 300. That is, on the basis of the direction shown in FIG. 13, when the module case 220 is pressed from left to right, the outline part of the module case 220 is inserted into the case insertion groove 310.

During this process, the first protrusion 230 interferes with the second protrusion 320. Then, if pressing power is continuously applied, the module case 220 is elastically deformed, and the first protrusion 230 runs over and crosses the second protrusion 320 to be coupled to one side of the second protrusion 320.

According to the above configuration, the module assembly 200 may be easily coupled to the case insertion groove 310 by being pressed toward (i.e., a straight movement) the module coupling part 300.

Figure 14:
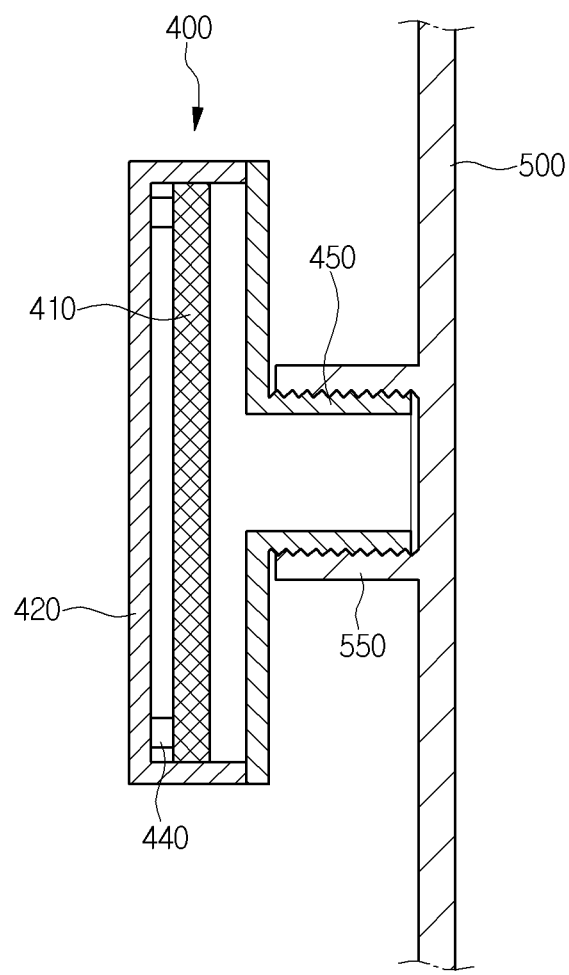
FIG. 14 is a sectional view when a module assembly is coupled to a module coupling part according to a second embodiment.

FIG. 14 is a sectional view when a module assembly is coupled to a module coupling part according to a second embodiment.

Referring to FIG. 14, the module assembly 400 according to the second embodiment is rotated and coupled to the module combining part 500 equipped in the appliance 100.

The module assembly 400 includes a communication module 410, a module case 420 for receiving the communication module 410, and a coupling member 440 for coupling the communication module 410 with the module case 420.

Moreover, the module assembly 400 includes a first screw coupling part 450 for coupling the module assembly 400 with the module coupling part 500. Moreover, the module coupling part 500 includes a second screw coupling part 550 for guiding the coupling of the module assembly 400.

The first screw coupling part 450 is rotated and coupled to the second screw coupling part 550.

The module assembly 400 is easily coupled to the module coupling part 500 by using rotation power.

Another embodiment is suggested.

In the above embodiments, the module assembly is coupled to the inside of the module coupling part by using applied pressing power or rotation coupling power. Unlike those, an additional coupling member (for example, bolts or rivets) may be used or adhesive members having storing adhesion may be inserted for coupling.

Figure 15:
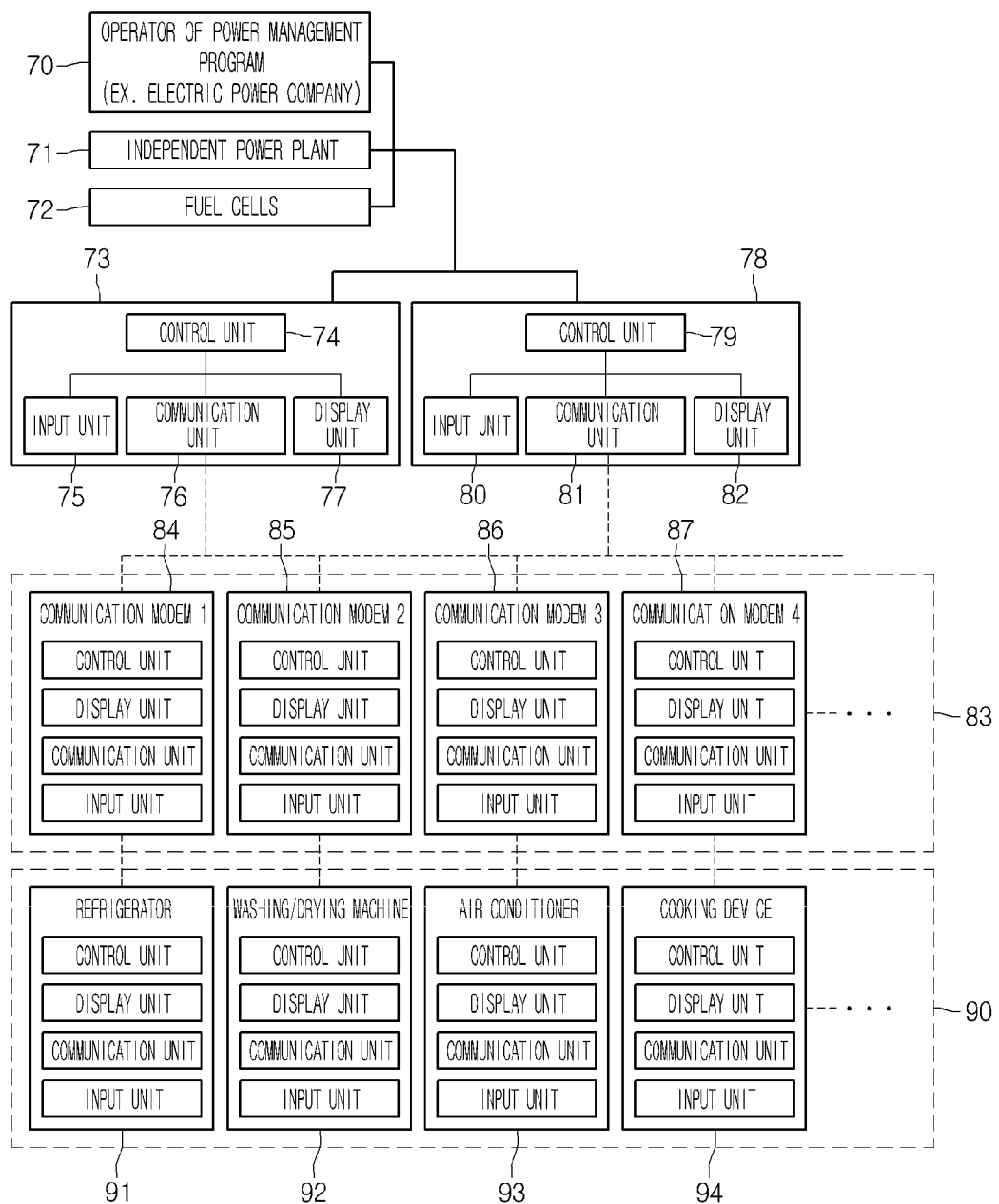
FIG. 15 is a control block diagram of a power management network including an appliance with a communication modem according to a third embodiment.

FIG. 15 is a control block diagram of a power management network including an appliance with a communication modem according to a third embodiment.

Referring to FIG. 15, a power management program operating subject 70 may be a power company including general power generation equipment (for fire power, nuclear power, and water power) or power generation equipment using renewable energy (for example, solar light, wind power, and geothermal heat), but the present invention is not limited thereto.

Moreover, a power management network includes a self-generation facility such as a solar power generation facility, which may be equipped in each home, and a fuel cell 72, which may be equipped in a fuel cell vehicle or a home.

Such a power supply source and the power management program operating subject 70 are connected to the AMI (i.e., a smart meter) 78 and the EMS 73.

Figure 16:
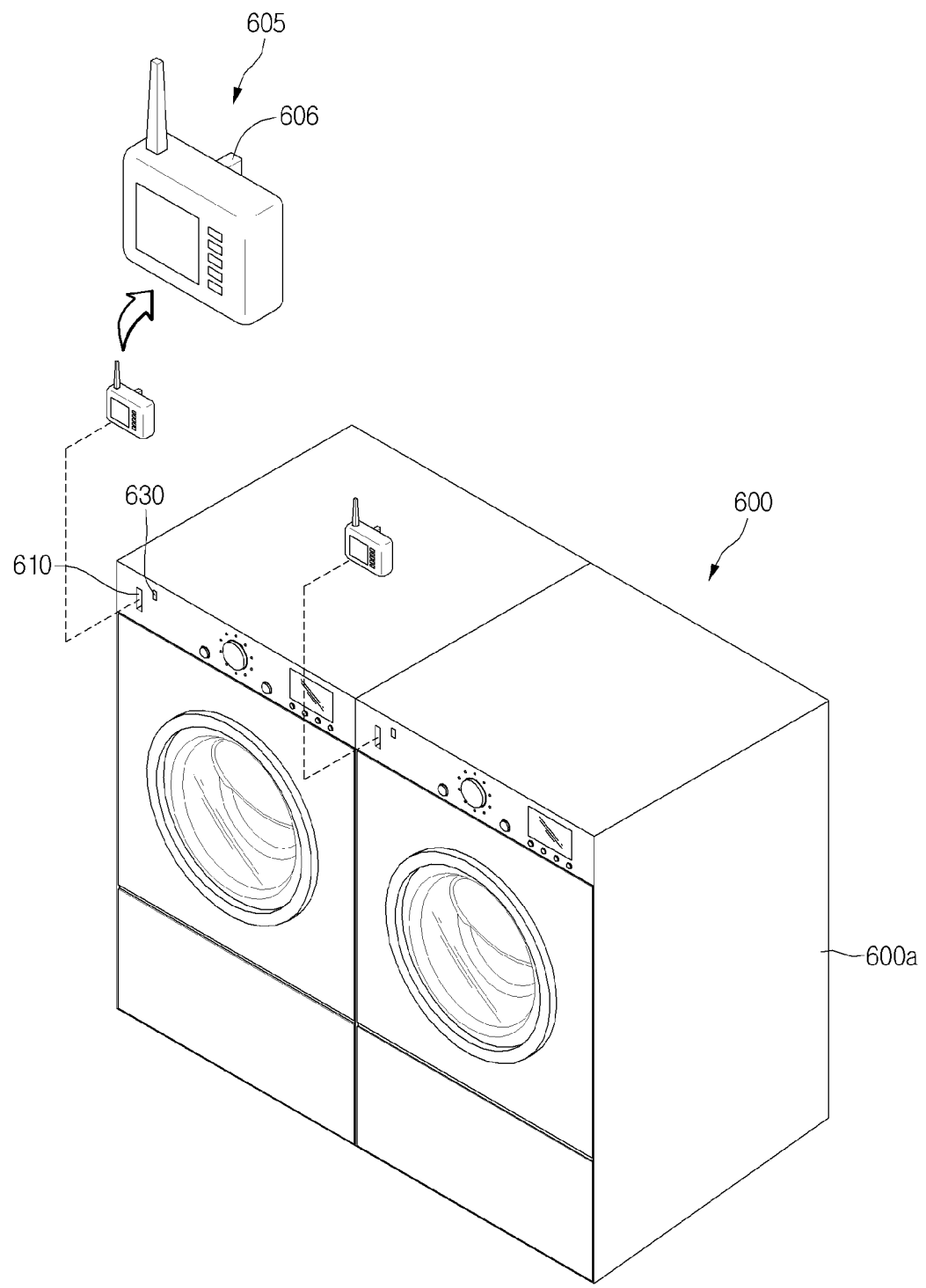
FIG. 16 is a perspective view when a communication modem is mounted at a washing machine and a drier according to a third embodiment.

Also, the AMI (i.e., a smart meter) 78 and the EMS 73 communicate with the above appliances through the communication modem 605 (see FIG. 16).

Here, the EMS 73 includes a control unit 74, an input unit 75, a communication unit 76, and a display unit 77, and the AMI (i.e., a smart meter) 78 includes a control unit 79, an input unit 80, a communication unit 81, and a display unit 82.

The communication units 34 and 24 communicate with communication modems 84 to 87 equipped in appliances in a home such as a refrigerator 91, a washing machine or drier 92, an air conditioner 93, and a cooking appliance 94, in order to transmit/receive power information and driving information.

In at least one of the AMI (i.e., a smart meter) 78 and the EMS 73, the control unit 24 or 35 recognizes setting information inputted by a user using the input unit 28 or 38, information on previously accumulated operations and power usage histories of appliances, and power amount supplied from an external in real time.

Moreover, the above information is processed in real time to control operations of the appliances and power supplied thereto.

Moreover, the display units 29 and 39 display power information supplied from a power supply source, operation information and power information of the appliances, and items related to a communication state of each appliance.

The EMS 73 and the AMI (i.e., a smart meter) 78 serve to control operations of the appliances, and its most important role is to provide a power charge saving mode that saves a power charge and an energy saving mode that saves power consumption while the appliances operate.

Here, the power charge saving mode is performed on the basis of information on a power charge, which varies according to an operating time of an appliance.

The EMS 73 or AMI (i.e., a smart meter) 78 serves to control appliances in consideration of a peak time at which a power charge is the most expensive throughout the day, or an upper target value of power consumption or a power charge.

Here, a power charge saving mode operation that considers a peak time interval or an upper target value may be performed by registering a power management program that a power company provides.

If customers receive power management after subscribing to such a power management program, a power charge may be saved and also an advantageous effect such as a power charge cut policy that a power company provides may be provided Since the communication modem 83; 84 to 87 include a control unit, a display unit, a communication unit, and an input unit, a current communication status may be displayed and a command of a user may be inputted.

The communication modem 605 is connected to the EMS 73 or the AMI (i.e., a smart meter) 78 for communication, so that a command according to a power management program delivered therethrough is delivered to the appliance 90.

Therefore, the appliance 90 may perform a control operation according to the power management program.

Additionally, the control unit of the communication modem 83 may have a function to control the appliance 90 in consideration of a power charge according to a time slot, or an upper target value of a power charge, or an upper target value of power consumption. By such a self control operation, a saving operation such as a power charge saving operation or a power consumption saving operation of the appliance 90 may be possible.

Each appliance includes a display unit and a control unit. The display unit displays an operating status of each appliance and also a communication status of a communication modem equipped in a corresponding appliance.

Accordingly, a user may easily recognize a communication status of the communication modem by looking at the EMS 73, or the AMI (i.e., a smart meter) 78, or the communication modem 83, or each appliance. If the communication status is not normal, the communication modem connected to the corresponding appliance may be properly mounted or replaced.

Furthermore, the control unit of the appliance 90 may store information necessary for performing a power management program by itself in case of emergency such as communication failure of a communication modem, for example, operation information for each time slot or power consumption information of each appliance.

FIG. 16 is a perspective view when a communication modem is mounted at a washing machine and a drier according to a third embodiment.

Referring to FIG. 16, a communication modem 605 is mounted at a main body 600a of the appliance 600.

The main body 600a and the communication modem 605 have a fixing structure in order to couple the main body 600a with the communication modem 605.

Here, the fixing structure includes a first coupling part 606 having an extension part that extends from the communication modem 605 to one side and a second coupling part 610 disposed at the main body 600a and having an insertion slot form to which the first coupling part 606 is inserted.

Moreover, a display unit 630 for displaying a mounting status of the communication modem 605 is prepared at one side of the second coupling part 610.

The display unit 630 has an LED of a lamp type, which emits different colors according to when the communication modem 605 is normally mounted or not.

Accordingly, when a user mounts the communication modem 605 shown in FIG. 16 at the appliance 700, the first coupling part 606 is inserted into the second coupling part 610, thereby completing the mounting of the communication modem 605.

Then, a mounting status of the communication modem 605 may be recognized according to a signal displayed on the display unit 630.

The appliance 600 is configured with a set including a washing machine and a drier as shown in FIG. 16, but the present invention is not limited thereto. That is, the set may include an air conditioner, a refrigerator, and a cooking appliance.

Figure 17:
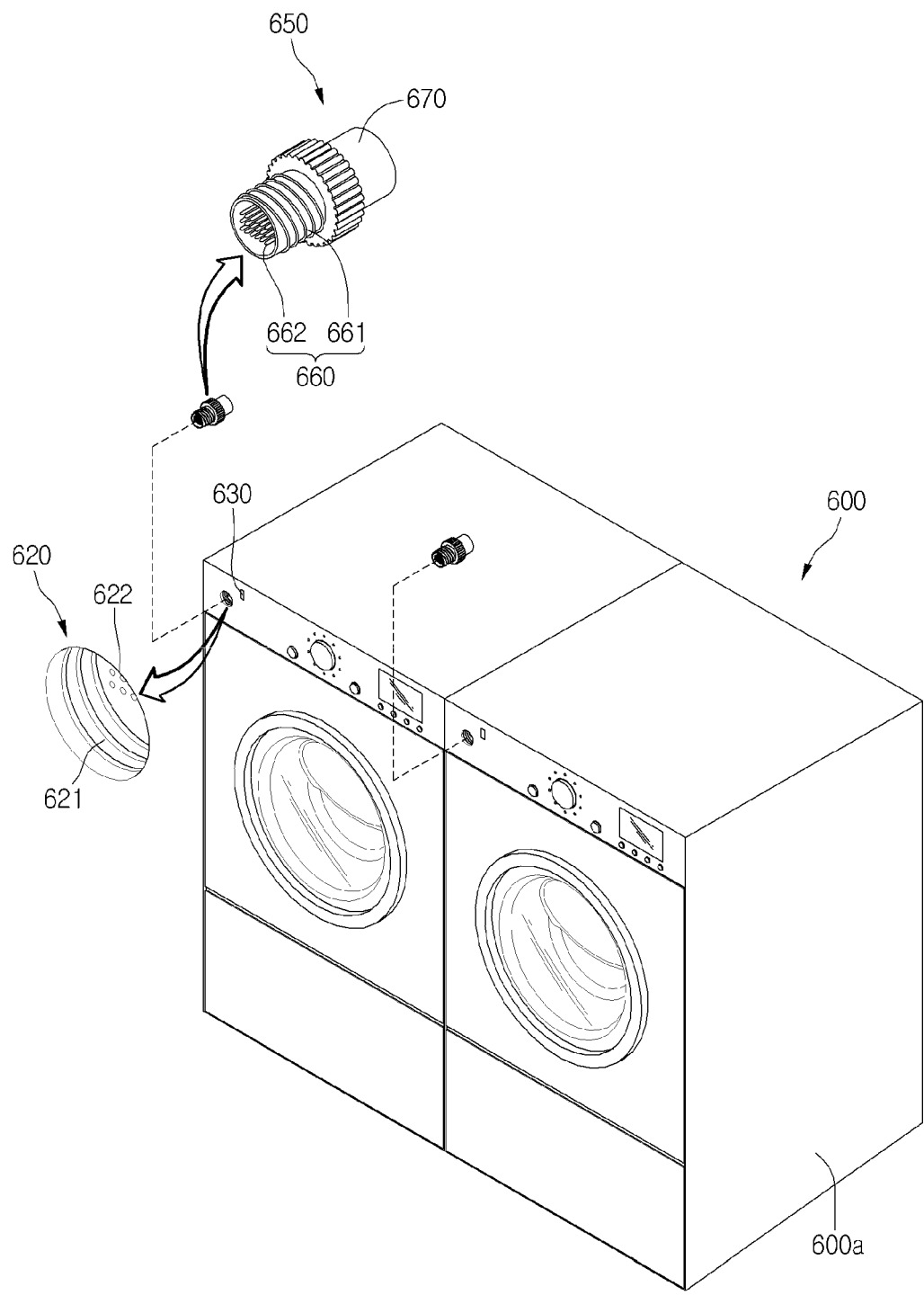
FIG. 17 is a perspective view when a communication modem is mounted at a washing machine and a drier according to a fourth embodiment.

FIG. 17 is a perspective view when a communication modem is mounted at a washing machine and a drier according to a fourth embodiment.

Referring to FIG. 17, the communication modem 650 has a pole or stick form not a terminal form.

Here, the communication modem 650 includes a communication unit 670 and a first coupling part 660 disposed at one end part of the communication unit 670. The first coupling part 660 includes a first screw part 661 at the outer surface and a communication pin 662 disposed at the inside of the first screw part 661.

Moreover, a second coupling part 620 is prepared at the front of the main body 600a in order to be coupled with the first coupling part 660. The second coupling part 620 includes a second screw part 621 screwed and coupled to the first screw part 661 and a communication pin coupling part 622 surrounded by the second screw part 621 and coupled to the communication pin 662.

Figure 18:
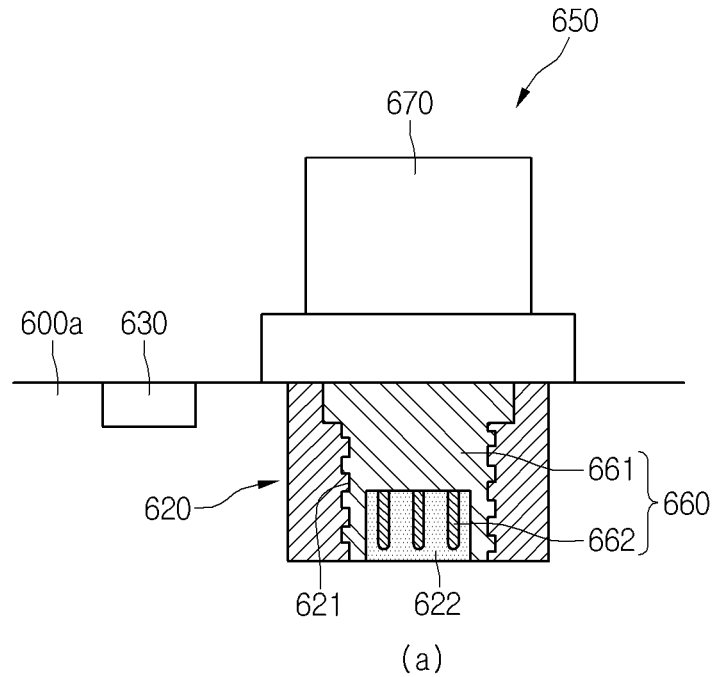
FIG. 18 is a sectional view illustrating a coupling state between a communication modem, and a washing machine and a drier shown in FIG. 17 according to an embodiment.
Figure 18:
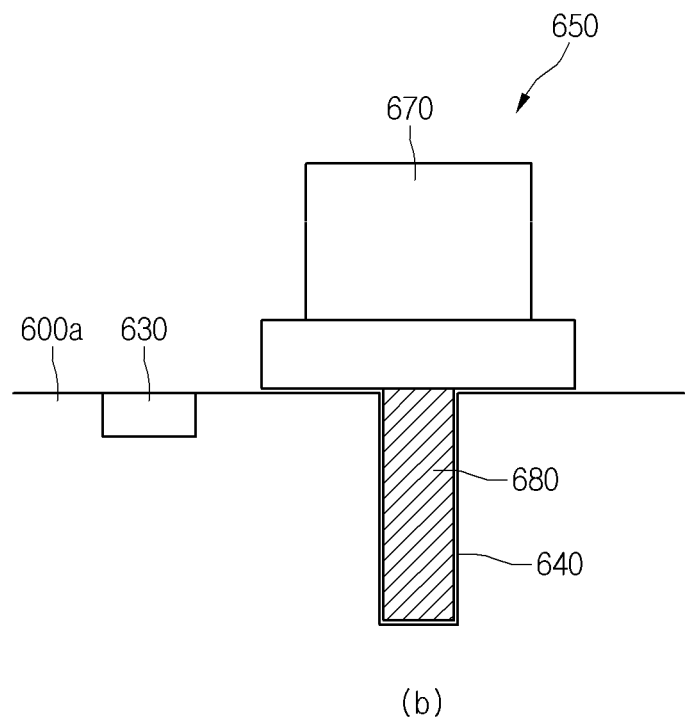

When mounting the communication modem 650 at the main body 600a, as shown in FIG. 18(a), a user allows the first screw part 661 of the first coupling part 660 to contact the second screw part 621 of the second coupling part 620 at the main body 600a and rotates it. Therefore, the communication mode 650 is screwed and coupled with the main body 600a.

Accordingly, the first coupling part 660 is coupled with the second coupling part 620. By doing so, the communication pin 662 is coupled with and is connected to the communication coupling part 622.

By such a connection, the appliance 600 may communicate with the communication modem 650.

As shown in FIG. 18(b), the second coupling part 640 having an insertion slot form is prepared at the main body 600a, and the first coupling part 680 of the communication modem 650 may have a key or bar type inserted into the first coupling part 680.

If the first coupling part 680 has a key or bar type, it may be more easily detachable.

Figure 19:
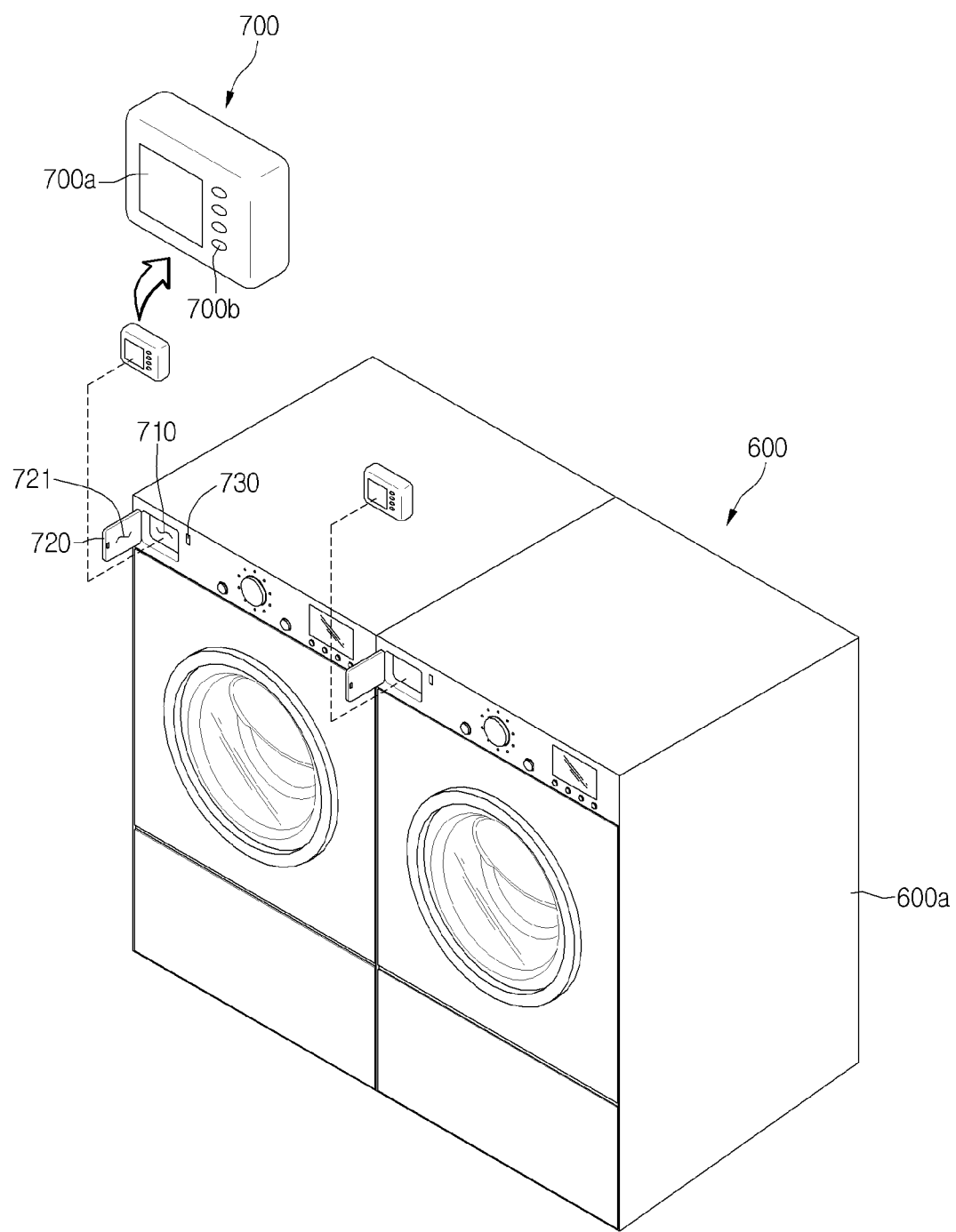
FIG. 19 is a perspective view when a communication modem is mounted at a washing machine and a drier according to a fifth embodiment.

FIG. 19 is a perspective view when a communication modem is mounted at a washing machine and a drier according to a fifth embodiment.

As shown in FIG. 19, the present embodiment may include a mounting groove 710 where the communication modem 700 is received, and a cover member 720 for covering that. The mounting groove 710 has a fixing structure for mounting the communication modem 700 at the main body 600a of the appliance 600.

Here, the cover member 720 is prepared at one side of the mounting groove 710, being rotatable, and serves to selectively cover the mounting groove 710. When the communication modem 700 is mounted on and received in the mounting groove 710, the cover member 720 protects that from an external.

Moreover, the cover member 720 may include a window part 721 for viewing the display unit 700a of the communication modem 700 without opening the cover member 720 and adjusting an input part 700b.

As the window part 721 is open or is formed of a thin transparent member, a user may manipulate the input part 700b exposed to or covered by the window part 721.

Moreover, contents displayed on the display part 700a may be seen through the window part 721.

Figure 20:
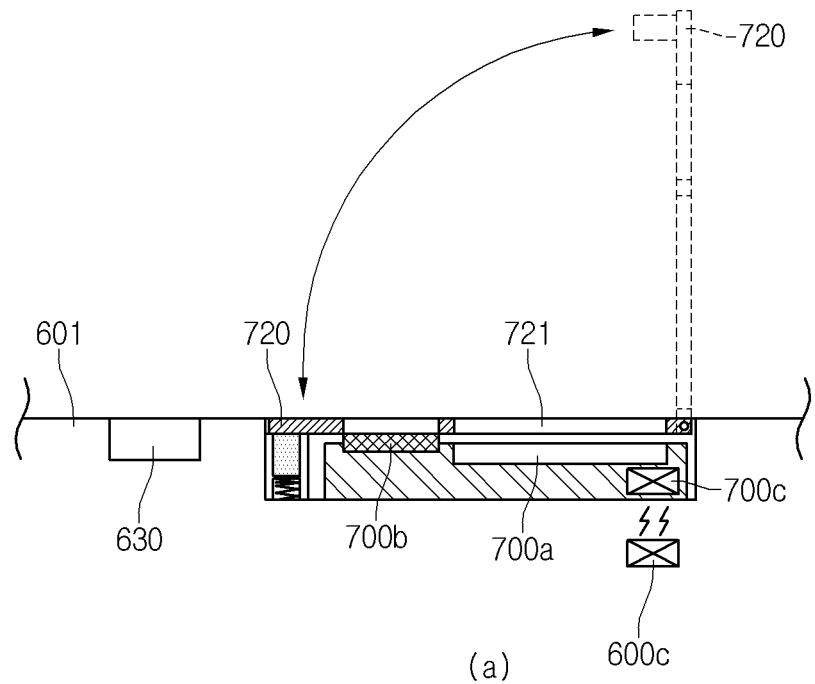
FIG. 20 is a sectional view illustrating a coupling state between a communication modem, and a washing machine and a drier shown in FIG. 19 according to an embodiment.
Figure 20:
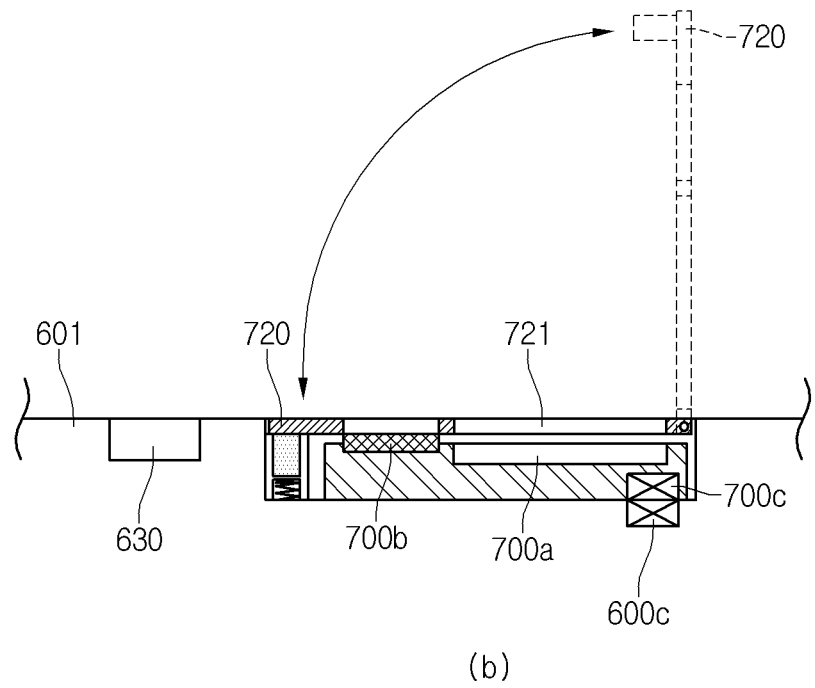

As shown in FIG. 20(a), the cover member 720 is prepared at one side of the mounting groove 710, being rotatable, thereby covering the communication modem 700.

Then, the window part 721 is disposed at the front of the display unit 700a and the input unit 700b of the communication modem 700, so that a user may recognize and make an input to the communication modem 700 without opening the cover member 720.

The communication unit 700c of the communication modem 700 may communicate with the communication unit 600c of the appliance with no contact point. Or, as shown in FIG. 20(b), contact communication may be performed through mutual contact.

Moreover, by such a no contact communication method or contact communication method, information may be transmitted/received and also power may be supplied to the communication modem 700.

Such a power supply to a communication modem in an appliance may be performed in the embodiment of FIGS. 20(a) and 20(b) and also in the embodiment of FIGS. 16 to 19.

Figure 21:
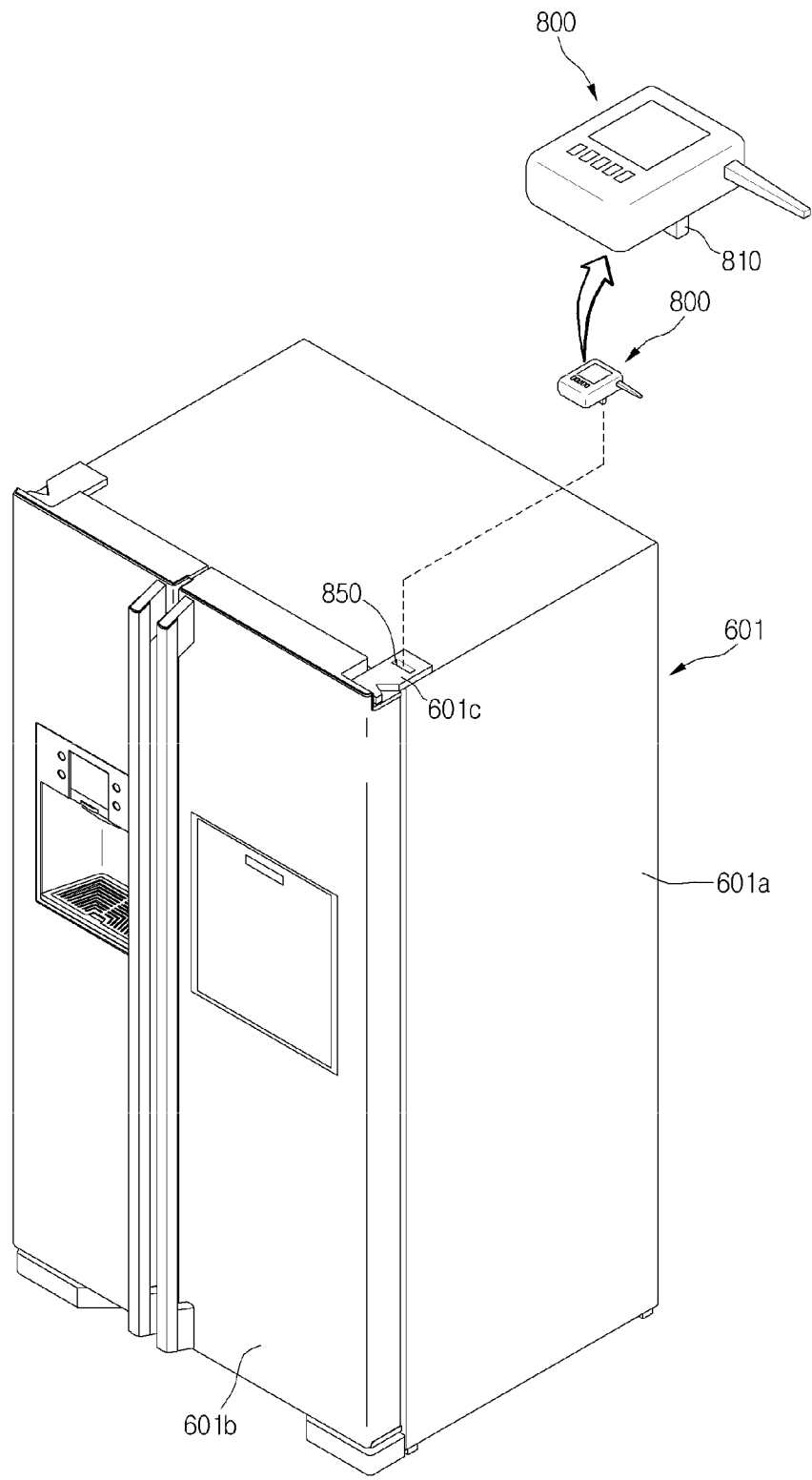
FIG. 21 is a perspective view when a communication modem is mounted at a refrigerator according to a sixth embodiment.

FIG. 21 is a perspective view when a communication modem is mounted at a refrigerator according to a sixth embodiment.

As shown in FIG. 21, an appliance is configured with the refrigerator 601. The refrigerator 601 includes a main body 601a, a door 601b for opening/closing the main body 601a, and a hinge member 601c connecting the main body 601a with the door 601b.

The hinge members 601c are prepared at the top and bottom of the door 601b. A communication modem 800 is disposed at the hinge member 601c at the top of the door 601b.

The communication modem 800 includes a first coupling part 810. The hinge member 601c includes a second coupling part 850 which the first coupling part 810 is inserted into and detachable from. Through this coupling, the communication modem 800 is connected to the refrigerator 601 for communication.

As mentioned above, by the couplings between the communication modems and the appliance shown in FIGS. 16 to 21, the appliance may receive power information and operation information from an external through the communication modem, and accordingly, may perform a power charge saving operation or a power consumption saving operation.

The invention claimed is:

1. A component for a network system comprising:
   an appliance capable of communicating with a home area network and capable of consuming an energy generated from an energy generation unit of a utility area network; and
   a communication module to allow communication between the appliance and an external component constituting the utility area network or the home area network,
   wherein the appliance comprises:
   a case;
   a panel receiving part bent from a front part of the case rearward;
   a control panel installed on the panel receiving part and including an enclosure and a display unit provided at a front of the enclosure to display an operation status of the appliance;
   a printed circuit board (PCB) disposed inside the enclosure of the control panel and installed at a back surface of the front of the enclosure to control an operation of the control panel; and
   a coupling port provided at the printed circuit board or the communication module,
   wherein the communication module is coupled to a surface of the printed circuit board through the coupling part such that a power is supplied to the printed circuit board via the communication module.

2. The component according to claim 1, wherein the communication module is wire-connected or wirelessly-connected to the printed circuit board.

3. The component according to claim 1, wherein the appliance comprises;
   a door disposed at one side of the case and selectively screening an inner space of the case; and
   a hinge part to allow the door to rotate thereby allowing the door to selectively screen the inner space of the case.

4. The component according to claim 3, wherein the communication module is mounted at the hinge part.

5. The component according to claim 1, wherein the appliance further comprises a module coupling part to which the communication module is coupled.

6. The component according to claim 5, further comprising:
   a first protrusion disposed at one side of the communication module; and
   a second protrusion disposed at the module coupling part that is capable of coupling to the first protrusion.

7. The component according to claim 5, further comprising:
   a first screw coupling part disposed at one side of the communication module; and
   a second screw coupling part disposed at the module coupling part that is capable of rotatably coupled to the first screw coupling part.

8. The component according to claim 5, further comprising a coupling member for coupling the communication module with the module coupling part.

9. The component according to claim 5, further comprising an adhesive member interposed between the communication module and the module coupling part to couple the communication module and the module coupling part together.

10. The component according to claim 1, further comprising a module case protecting an external of the communication module, wherein the module case is made of nonconductive material or an inside or outside of the module case is coated with nonconductive material.

11. The component according to claim 1, further comprising a fixing structure disposed on at least one of the appliance and the communication modem to fix the communication modem to the appliance.

12. The component according to claim 11, wherein the fixing structure comprises:
   a first coupling part that protrudes externally from the communication modem; and
   a second coupling part disposed in the appliance, to which the first coupling part is detachably coupled.

13. The component according to claim 12, wherein the first coupling part comprises a first screw part at a surface and a communication pin; and
   the second coupling part comprises a second screw part at a surface that is capable of corresponding with the first screw part of the first coupling part and a communication pin coupling part to which the communication pin is capable of being coupled.

14. The component according to claim 12, wherein the first coupling part comprises an extension part that extends from the communication unit of the communication modem at one side and the second coupling part comprises an insertion slot to which the extension part is inserted.

15. The component according to claim 11, wherein the fixing structure comprises a mounting groove into which the communication modem is received and mounted; and a cover member disposed at one side of the mounting groove, being rotatable, and is capable of covering the mounting groove.

16. The component according to claim 15, further comprising a window part disposed at the cover member, wherein the communication modem is capable of being controlled through the window part without opening the cover member when the cover member covers the communication modem received in the mounting groove.

17. The component according to claim 11, wherein the appliance comprises a washing machine or a drier; and
    the fixing structure is disposed at the front of the appliance in order to allow the communication modem to be mounted at the front of the appliance.

18. The component according to claim 11, wherein the appliance comprises a refrigerator; and
    the fixing structure is disposed at the top of the hinge member in order to allow the communication modem to be mounted at a door hinge member of the refrigerator.

* * * * *